United States Patent [19]
Shimonishi

[11] Patent Number: 6,138,172
[45] Date of Patent: Oct. 24, 2000

[54] DATA OUTPUT CONTROL DEVICE WITH A PLURALITY OF QUEUES AND QUEUES NUMBER LISTS

[75] Inventor: Hideyuki Shimonishi, Tokyo, Japan

[73] Assignee: NEC Corporation, Tokyo, Japan

[21] Appl. No.: 09/118,650

[22] Filed: Jul. 17, 1998

[30] Foreign Application Priority Data

Jul. 18, 1997 [JP] Japan ................................ 9-210076

[51] Int. Cl.[7] ............................ G06F 13/00; G06F 13/20
[52] U.S. Cl. .................................... 710/1; 710/1; 710/111
[58] Field of Search ................................ 710/1, 40, 41, 710/111, 39, 58

[56] References Cited

U.S. PATENT DOCUMENTS

| | | | |
|---|---|---|---|
| 3,824,383 | 7/1974 | Inose et al. ............................... | 714/16 |
| 5,231,633 | 7/1993 | Hluchyj et al. ........................... | 370/429 |
| 5,564,062 | 10/1996 | Meaney et al. .......................... | 710/244 |
| 5,623,603 | 4/1997 | Jiang et al. ............................... | 709/207 |
| 5,724,358 | 3/1998 | Headrick et al. ........................ | 370/418 |
| 5,729,702 | 3/1998 | Creedon et al. ......................... | 710/111 |
| 5,996,019 | 11/1999 | Hauser et al. ........................... | 709/235 |
| 6,003,060 | 12/1999 | Aznar et al. ............................. | 709/103 |

OTHER PUBLICATIONS

Manolis Katevenis, "Weighted Round–Robin Cell Multiplexing In A General–Purpose ATM Switch Chip", IEEE Journal On Selected Areas In Communications, vol. 9, No. 8, Oct. 1991, pp. 1265–1279.

*Primary Examiner*—Thomas C. Lee
*Assistant Examiner*—Chun Cao
*Attorney, Agent, or Firm*—Scully, Scott, Murphy & Presser

[57] ABSTRACT

The present invention is directed to a data output control device which stores input data within a queue, before outputting data to an output circuit from a queue that is storing data, so as to guarantee a minimum speed of data output, and therefore reduces processing time for the operation of selecting the output queue.

18 Claims, 30 Drawing Sheets

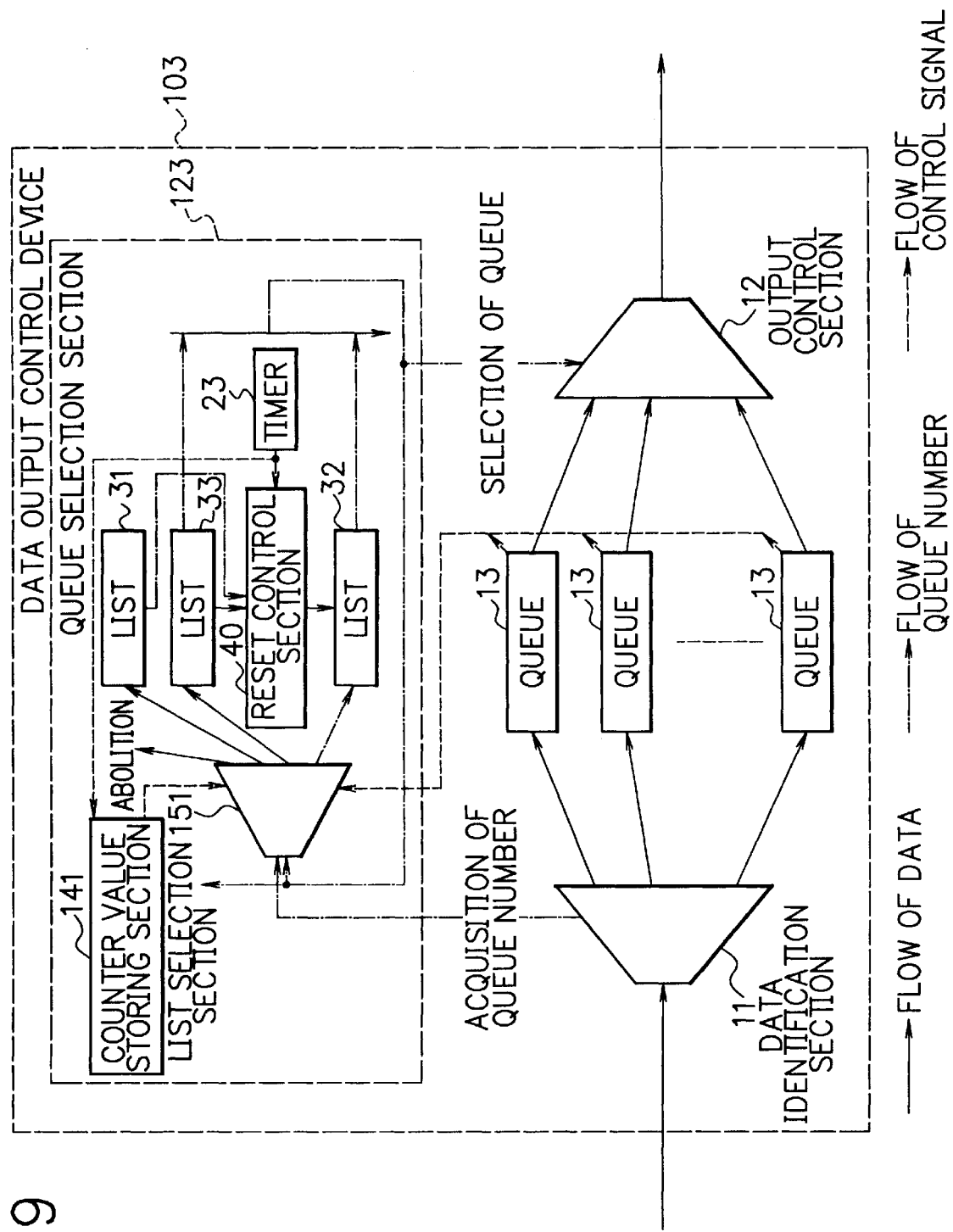
F I G. 9

DATA OUTPUT

DATA OUTPUT

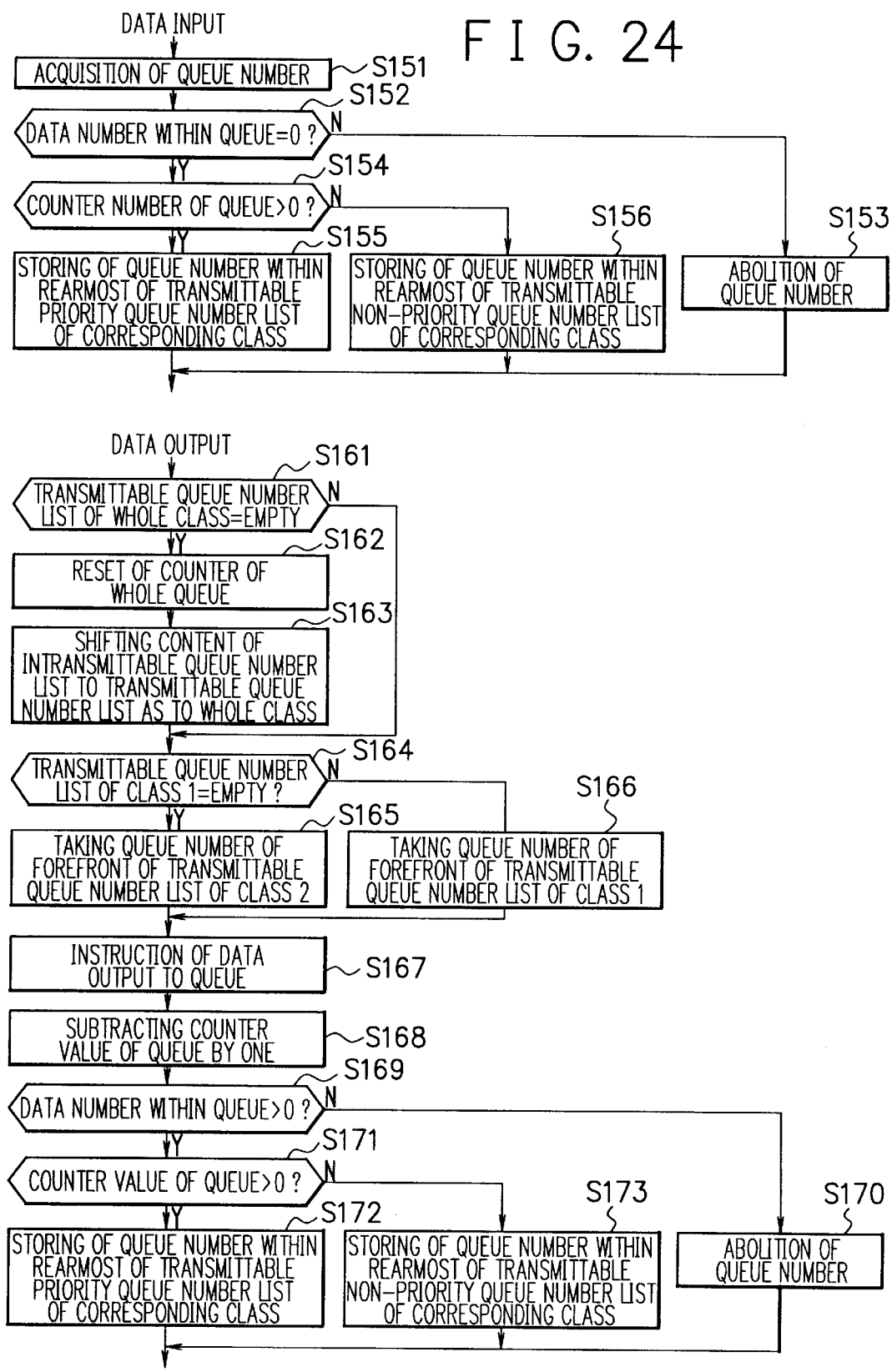
F I G. 24

DATA OUTPUT CONTROL DEVICE WITH A PLURALITY OF QUEUES AND QUEUES NUMBER LISTS

BACKGROUND OF THE INVENTION

The present invention relates to an improvement of a data output control method which cause an input data to be stored within an appropriate queue based on its attribute, before selecting queue from respective queues, so as to guarantee the minimum speed of an output data, thus outputting data to a single output circuit from respective queues.

DESCRIPTION OF THE RELATED ART

Formerly, by way of this kind of the data output control method, there is the Weighted Round Robin system disclosed in (M. Katavenis and others, Weighted Round-Robin Cell Multiplexing in a General-Purpose ATM Switch Chip, IEEE J. Selected Areas in Communication Vol. 9, No. 8(1512) 1265–1279).

In the Weighted Round Robin system, which causes a selective operation of a queue which implements data output to be executed by using different respective significance, and which guarantees the minimum speed of a data output in accordance with ratio of the respective significance in relation to respective queues, thus surplus capacity of the output circuit is allocated in relation to respective queues in accordance with the ratio of these significance.

In the Weighted Round Robin system, each queue has a weight and a counter. The weight is a significance which is rendered to the each queue, and an initial value of a counter is a value of the weight. The Weighted Round Robin system causes the queue which has data and whose value of the counter is more than 1 (one) to be sought from succeeding queues of the queue which has implemented data output at the last occasion in every output time of respective data in cyclic sequence. Subsequently, the system transmits one of the data from the queue, thus subtracting value of the counter of the queue by one. When there is no queue which is capable of implementing data output, namely, when there is no queue whose value of the counter is more than 1 (one) and which has data more than one, the system implements a reset operation that it causes the value of whole counters to be returned to the value of the weight, before selecting the queue implementing data output to execute data output.

FIG. 1 is a view showing one configuration example of a data output control device to which the Weighted Round Robin system is applied. When the data is inputted to the data output control device 101, an input data is stored within an appropriate queue 13 depend upon its attribute due to the data identification section 11. The output control section 12 fetches one of the data from the queue which is instructed by the queue selection section 121 to output to the output circuit in every respective data output time.

The queue selection section 121 has a counter value storing section 140 for holding value of the weight and the counter in every respective queues, and a queue number hold section 26 for holding a queue number after transmitting last data. A discrimination section 18 judges whether or not data from the queue is capable of being transmitted by data number in the queue 13 and a counter value within the counter value storing section 140. A queue number addition section 27 and the discrimination section 18 cause the queue which has data and whose value of the counter is more than 1 (one) to be sought from succeeding queues of the queue with last transmission of data in cyclic sequence. Then, the discrimination section 18 instructs to the output control section 12 so as to output the data from the queue, simultaneously, causing the counter value of the selected queue to be subtracted by one in the counter value storing section 140. When the counter value storing section 140 loses the queue which has data and whose value of the counter is more than 1 (one), implementing a reset operation that it causes the value of the counter of whole queue to be returned to the value of the respective weights.

FIG. 2 shows another configuration example of the data output control device to which the Weighted Round Robin system is applied. In this example of the data output control device 102, a configuration of the queue selection section 122 is different from the queue selection section 121 of FIG. 1 in that every respective queues has a discrimination section 19 which judges propriety of the data transmission from the queue rendered thereto both from data number within the queue 13 and counter value in the counter value storing section 140. It is capable of seeking existence of data and the counter value in terms of whole queues simultaneously by the plurality of discrimination sections 19. A selection circuit 28 selects the queue which implements data output based on the judging result and the queue number with output of last data being held in a queue number hold section 26.

The first problem of the Weighted Round Robin system is that processing operations for the queue selection is numerous when the number of the queue is especially numerous. In the configuration of FIG. 1, in the case of selection of the queue, the processing time in answer to the whole queue number in connection with the queue selection is required because more than one of the queue should be sought until the queue which has data and whose value of the counter is more than 1 (one) is found. Further, in the configuration of FIG. 2, it is capable of implementing selection of the queue by using time which is independent on the queue number, however, the number of the discrimination section in answer to the queue number is required so that circuit number is increased.

The second problem is that the processing quantity of condition assessment for implementing reset operation is numerous. In the condition assessment, since it is necessary to search both of data number in the whole queues and the counter value of the whole queues, in the configuration of FIG. 1, processing time in answer to the queue number is required, while in the configuration of FIG. 2, circuit number in answer to the queue number is required.

The third problem is that processing time or processing quantity in answer to the whole queues for implementing reset operation become necessary, in order to reset the counter of the whole queues simultaneously at the time of reset operation of the counter.

The fourth problem is that there occurs probability that delay requirement of the queue under severe delay requirement is not met. Because the Weighted Round Robin system selects respective queues cyclically with regard to the plurality of the queues whose value is more than one and which has data more than 1 (one), thus delay requirement is severe, and both of the queue which is required to output data with priority, and the queue which is required to output data without priority are treated equally.

In the Weighted Round Robin system, which causes the minimum data speed to be guaranteed in accordance with the ratio of the respective weights in relation to the respective queues, when the capacity of the output circuit is surplus, it causes the surplus capacity of the output circuit to be divided in accordance with the ratio of the weight of the respective queues. However, it might be thought that there exists requirement to want to divide with another ratio such as division into equal parts. The fifth problem is that the Weighted Round Robin system is incapable of coping with such requirement.

SUMMARY OF THE INVENTION

In view of the foregoing, it is an object of the present invention to provide a data output control method which enables processing quantity of selection operation of the queue and processing quantity of condition assessment for implementing the reset operation to be reduced while guaranteeing minimum data transmitting speed in relation to the respective queues.

It is another object of the present invention to provide a data output control method which enables the surplus capacity of the output circuit to be allocated with a voluntary ratio into the respective queues while guaranteeing minimum data transmitting speed in relation to the respective queues.

It is further object of the present invention to provide a data output control method which enables the data to be outputted with priority from the queue which is to transmit data with priority, while guaranteeing the minimum data speed in relation to the whole queues by possessing the fixed order of priority based on order class of priority to which respective queues belong.

It is still further object of the present invention to provide a data output control method which enables the processing quantity of processing which is required for the reset operation simultaneously to be reduced.

In one arrangement to be described below by way of example in illustration of the invention, a data output control method in which there is provided a plurality of queues, thus causing an input data to be stored within an appropriate queue based on its attribute, subsequently outputting data to single output circuit from these queues, comprises the steps of causing an identical queue number to exist at most one number in whole lists while using a plurality of lists within which queue number is stored; storing said queue number within an appropriate list in answer to at least one condition either data output propriety condition of the queue or degree of priority, unless the queue possesses data with exception of input data when input data is stored within the queue; transmitting one of the data from a queue of a taken number while taking a queue number from a forefront of a list by selecting an appropriate list when outputting data to an output circuit, and while storing a queue number within an appropriate list due to above condition if said queue possesses data with exception of the outputted data; and implementing reset operation of both of a change of the above condition of respective queues and a movement of queue number among the lists in every constant time intervals or in every time when specific list becomes empty.

In another arrangement to be described below by way of example in illustration of the invention, a data output control method, in which there is provided a plurality of queues, thus causing an input data to be stored within an appropriate queue based on its attribute, subsequently outputting data to single output circuit from these queues, comprises the steps of causing an identical queue number to exist at most one number in whole lists while using both of a transmittable queue number list for hold a number of a queue which has data and which is capable of outputting data, and a non-transmittable queue number list for hold a number of a queue which has data and which is incapable of outputting data; storing the queue number within an appropriate list in accordance with propriety of data transmission from a queue when said queue does not possess data with exception of input data while storing the input data within the queue; transmitting one of the data from a queue of a taken number while taking a queue number from a forefront of the transmittable queue number list when outputting data to an output circuit, after the data transmission, if the queue possesses data with exception of the outputted data, causing the queue number to be stored again within an appropriate list, when the number of data outputted from the queue after last reset operation becomes more than fixed number, said queue is taken to be non-transmittable state, while when the transmittable queue number list is empty in case of outputting data, whole queues are taken to be data transmission possible state, thus implementing a reset operation that it causes content of the non-transmittable queue number list to shift to the transmittable queue number list.

In yet another arrangement to be described below by way of example in illustration of the present invention, a data output control method in which there is provided a plurality of queues, thus causing an input data to be stored within an appropriate queue based on its attribute, subsequently outputting data to single output circuit from these queues, comprises the steps of causing an identical queue number to exist at most one number in whole lists while using both of a transmittable priority queue number list for hold a number of a queue which has data and which is capable of outputting the data by priority, and a transmittable non-priority queue number list for hold a number of a queue which has data and which is capable of outputting data by non-priority; storing the queue number within an appropriate list in accordance with current degree of the priority from a queue when said queue does not possess data with exception of input data while storing the input data within the queue; transmitting one of the data from a queue of a taken number while taking a queue number from the forefront of queue of the transmittable priority queue number list, if the transmittable priority queue number list is empty, thus taking a queue number from the forefront of the transmittable non-priority queue number list when outputting data to an output circuit, after the data transmission, if the queue possesses data with exception of the outputted data, causing said queue number to be stored again within an appropriate list in accordance with the degree of priority of the queue, when the number of data outputted from the queue after last reset operation becomes more than fixed number, said queue is taken to be non-priority state; and taking the whole queues to be priority state in every fixed time intervals, thus implementing a reset operation that it causes content of the transmittable non-priority queue number list to shift to the transmittable priority queue number list.

In yet another arrangement to be described below by way of example in illustration of the present invention, a data output control method in which there is provided a plurality of queues, thus causing an input data to be stored within an appropriate queue based on its attribute, subsequently outputting data to single output circuit from these queues, comprises the steps of causing an identical queue number to exist at most one number in whole lists while using both of a transmittable priority queue number list for hold a number of a queue which has data and which is capable of outputting data by priority, and a transmittable non-priority queue number list for hold a number of a queue which has data and which is capable of outputting data by non-priority; storing the queue number within an appropriate list in accordance with current degree of the priority from a queue when said queue does not possess data with exception of input data while storing the input data within the queue; transmitting one of the data from a queue of a taken number while taking a queue number from the forefront of queue of the transmittable priority queue number list, if the transmittable priority queue number list is empty, thus taking a queue number from the forefront of the transmittable non-priority queue number list when outputting data to an output circuit, after the data transmission, if the queue possesses data with exception of the outputted data, causing said queue number to be stored again within an appropriate list in accordance with the degree of priority of the queue, when the number of data outputted from the queue after last reset operation becomes more than fixed number, the queue is taken to be non-priority state; and taking the whole queues to be priority state in every fixed time intervals, thus implementing a reset operation that it causes content of the transmittable non-priority queue number list to shift to the transmittable priority queue number list.

In yet another arrangement to be described below by way of example in illustration of the present invention, a data output control method in which there is provided a plurality of queues, thus causing an input data to be stored within an appropriate queue based on its attribute, subsequently outputting data to single output circuit from these queues, comprises the steps of causing an identical queue number to exist at most one number in whole lists, while using a transmittable priority queue number list for hold a number of a queue which has data and which is capable of outputting said data by priority, a transmittable non-priority queue number list for hold a number of a queue which has data and which is capable of outputting data by non-priority, and an non-transmittable queue number list for hold a number of a queue which has a data and which is incapable of outputting data; storing the queue number within an appropriate list in accordance with current degree of the priority of the queue and propriety of data transmission from the queue, when the queue does not possess data with exception of the input data while storing the input data within the queue; transmitting one of the data from a queue of a taken number while taking a queue number from the forefront of queue of the transmittable priority queue number list, if the transmittable priority queue number list is empty, thus taking a queue number from the forefront of the transmittable non-priority queue number list before the queue is taken to be non-transmittable state, when outputting data to an output circuit, after the data transmission, if the queue possesses data with exception of the outputted data, causing the queue number to be stored again within an appropriate list, when the number of data outputted from the queue after last reset operation becomes more than fixed number, the queue is taken to be non-priority state, if the queue is of the non-priority state and the queue is not subjected to a reset operation in relation to the non-priority state at most one time, or if the number of data transmitted from the queue after last reset operation in relation to the non-priority queue is more than another fixed number, thus taking the queue to be data non-transmittable state; and implementing a reset operation in relation to the whole queues in every fixed time intervals, namely taking the whole queues to be data transmission possible state and priority state, thus implementing operation that it causes content of said transmittable non-priority queue number list and content of the non-transmittable queue number list to shift to the transmittable priority queue number list, further whenever the transmittable non-priority queue number list becomes empty, a reset operation in relation to non-priority queue, namely, taking the whole queues which are of the non-transmittable state to be the queues which are of the transmittable state, thus implementing operation that it causes content of the non-transmittable queue number list to shift to the transmittable non-priority queue number list.

In one particular arrangement to be described in illustration of the present invention, by way of example, a data output control method in which further comprises the steps of possessing respective kinds of lists corresponding each number of class for order of priority; possessing fixed order of priority based on priority order class to which respective queues belong; and storing a queue number within a list of the priority order class to which the queue belongs in the list of storing kind when it causes the queue number to be stored within the list, while when taking the queue number from the list, taking the queue number from the list which has the queue number more than one, and which is of the highest priority order.

In another arrangement to be described in illustration of the present invention, by way of example, a data output control device in which there is provided a plurality of queues, thus causing an input data to be stored within an appropriate queue based on its attribute, subsequently outputting data to single output circuit from these queues, comprises the step of implementing a reset operation with the whole queues as the priority state in every fixed time intervals, while possessing two states of one state where respective queues are capable of transmitting data by priority and other state where respective queues are capable of transmitting data by non-priority, subsequently, the queue comes into non-priority state after transmission of data of fixed number, thus transmitting data from the queue in priority state in preference to the queue of the non-priority state, when there is no queue of the priority state or when the whole queues of the priority state do not possess the data, it causes the data to be transmitted with voluntary ratio from the queue of the non-priority state by using surplus capacity of the output circuit.

In one particular arrangement to be described in illustration of the present invention, by way of example, a data output control method wherein respective queues possess two state of one state where it is capable of transmitting data by priority and the other state where it is capable of transmitting data by non-priority, in addition thereto, possessing fixed order of priority based on the attributive priority order class.

In yet another arrangement to be described in illustration of the present invention, by way of example, a data output control method wherein it causes the reset operation in relation to respective queues to be implemented at respective queues individually instead of occurring all together at the time when the reset operation is instructed, and a reset operation in relation to one queue is implemented, when data is inputted to the queue in the beginning after the reset operation is instructed.

In yet particular arrangement to be described in illustration of the present invention, by way of example, a data output control method wherein it causes the time when a reset operation is instructed lastly to be stored, and the time when the last reset operation is implemented by respective queues to be stored, when storing the data within the respective queues, by comparing the time when the last reset operation of the queue which stores data with the time when the reset operation is instructed lastly, when the two times are different from with each other, it causes the reset operation to be implemented in terms of the queue.

In yet another particular arrangement to be described in illustration of the present invention, by way of example, a data output control method wherein it causes the number of times which a reset operation is instructed to be stored, and the number of times which the last operation is implemented by respective queues actually to be stored, when storing the data within respective queues, by comparing the number of times of the reset operation implemented by the queue which stores data with the number of times which the reset operation is instructed, if the two number of times are different from each other, it causes the reset operation to be implemented in terms of the queue.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 9 is a block diagram showing a data output control device according to a third embodiment of the present invention;

FIG. 24 is a flow chart showing an operation example of the queue selection section in the data output control device according to the eighth embodiment of the present invention;

DETAILED DESCRIPTION OF THE PREFERRED EMBODIMENTS

Preferred embodiments of the present invention will now be described in detail referring to the accompanying drawings.

[FIRST EMBODIMENT]

Figure 3:
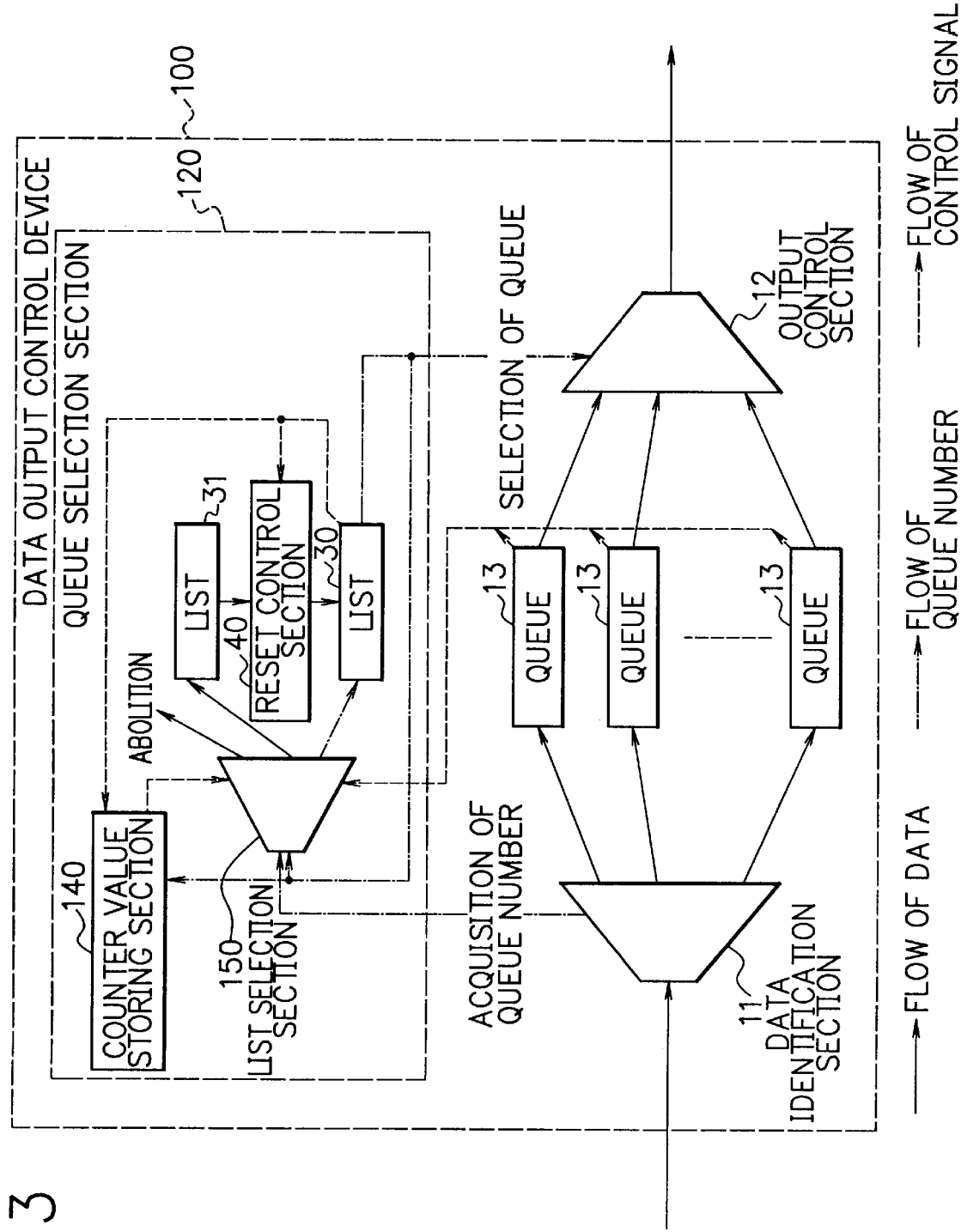
FIG. 3 is a block diagram showing a data output control device according to a first embodiment of the present invention.

FIG. 3 is a block diagram of a present first embodiment. As shown in FIG. 3, a data output control device 100 comprises a plurality of queues 13, a data identification section 11 for storing the data within the appropriate queue 13 corresponding to its attribute (for example service class) while implementing identification of data which arrives at the data identification section 11. a queue selection section 120 for selecting the queue 13 which is to output data, and an output control section 12 for taking one of the data from the queue 13 to output to an output control section 12 in accordance with instruction of the queue selection section 120.

Further, the queue selection section 120 comprises a counter value storing section 140 for holding both of a value of a counter and a value of a weight in every respective queues 13, a transmittable queue number list 30 for holding the number of the queue which has data more than one, and whose value of the counter is more than 1 (one), an non-transmittable queue number list 31 for holding the number of the queue which has data more than one, and whose value of the counter is 0 (zero), a list selection section 150 for receiving the number of the queue 13 within which the input data is stored from the data identification section 31, thus storing the number of the queue within an appropriate list, while discarding the number of a queue which is not in use, and a reset control section 40 for implementing a reset operation of the list.

Figure 4:
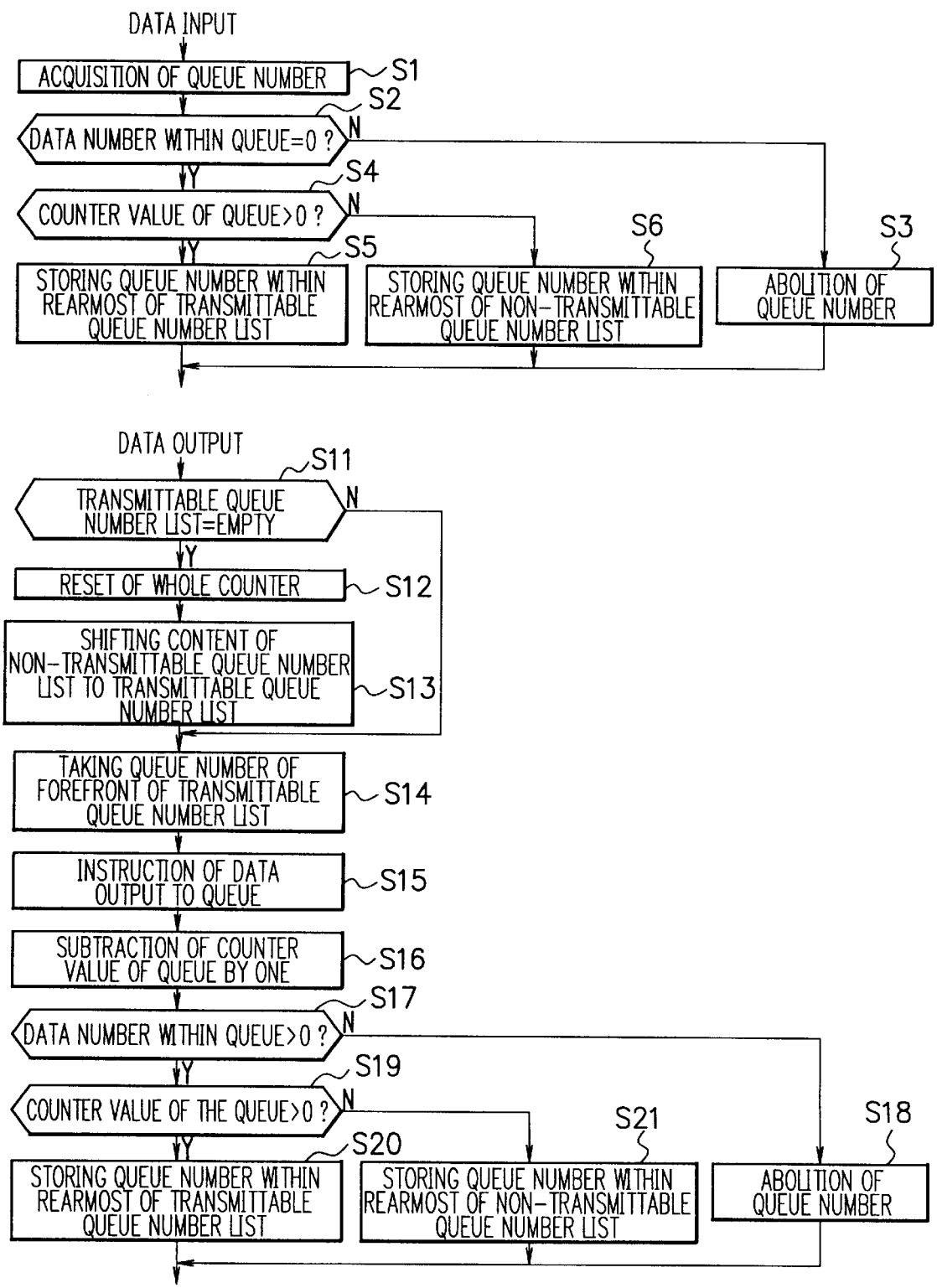
FIG. 4 is a flow chart showing an operation example of a queue selection section in the data output control device according to the first embodiment of the present invention.

FIG. 4 is a flow chart showing an operation example of the queue selection section 120 in the present first embodiment.

Next, operation of the present first embodiment will be described referring to FIGS. 3 and 4.

In the initial state of the operation, both of the transmittable queue number list 30 and the non-transmittable queue number list 31 are empty, and the counters of respective queues 13 are set to the value of the respective weights.

When the input data arrives at the data output control device 100, the input data is stored within the appropriate queue 13 by the data identification section 11, simultaneously, the queue number is transmitted to the queue selection section 120.

When the list selection section 150 in the queue selection section 120 acquires the queue number (S1), if the queue 13 of the queue number possesses data with the exception of the present input data (N of S2), discarding the queue number being transmitted (S3), while if the queue 13 of the queue number possesses data which is identical with the present input data (Y of S2), by searching the counter value of the queue (S4), when the value of the counter is more than 1 (one) (Y of S4), the list selection section 150 causes the number of the queue 13 to be stored within the rearmost of the transmittable queue number list 30 (S5), when the value of the counter is 0 (zero) (N of S4), the list selection section 150 causes the number of the corresponding queue 13 to be stored within the rearmost of the non-transmittable queue number list 31 (S6).

Next, the queue selection section 120 takes the queue number from the forefront of the transmittable queue number list 30 in every respective data output times (S14). Only when the transmittable queue number list 30 is empty (Y of S11), the reset operation is implemented in such a way that the reset control section 40 causes the value of counter of whole queues 13 in the counter value storing section 140 to be returned to the value of respective weights (S12), and causes the whole content of the non-transmittable queue number list 31 to be shifted to the transmittable queue number list 30 (S13), before taking the queue number from the forefront of the transmittable queue number list 30 (S14). The queue number being taken out is transmitted to the output control section 12 in the company of an instruction of the data output (S15).

The output control section 12 takes one of data from the queue 13 corresponding to the queue number which is taken out from the forefront of the transmittable queue number list to output to the output circuit.

The list selection section 150 causes the value of the counter of the queue 13 to be subtracted by one (S16), if the data number within the queue 13 is 0 (zero) after data output (N of S17), causing the queue number of the queue 13 to be discarded (S18), while if data number in the queue 13 is not 0 (zero) after data output (Y of S17), by searching the counter value of the queue 13 (S19), when the value of counter of the queue 13 is more than 1 (one) (Y of S19), thus storing the number of the queue 13 within the rearmost of the transmittable queue number list 30 (S20), when the value of counter of the queue 13 is 0 (zero) (N of S19), thus storing the number of queue 13 within the rearmost of the non-transmittable queue number list 31 (S21).

Figure 5:
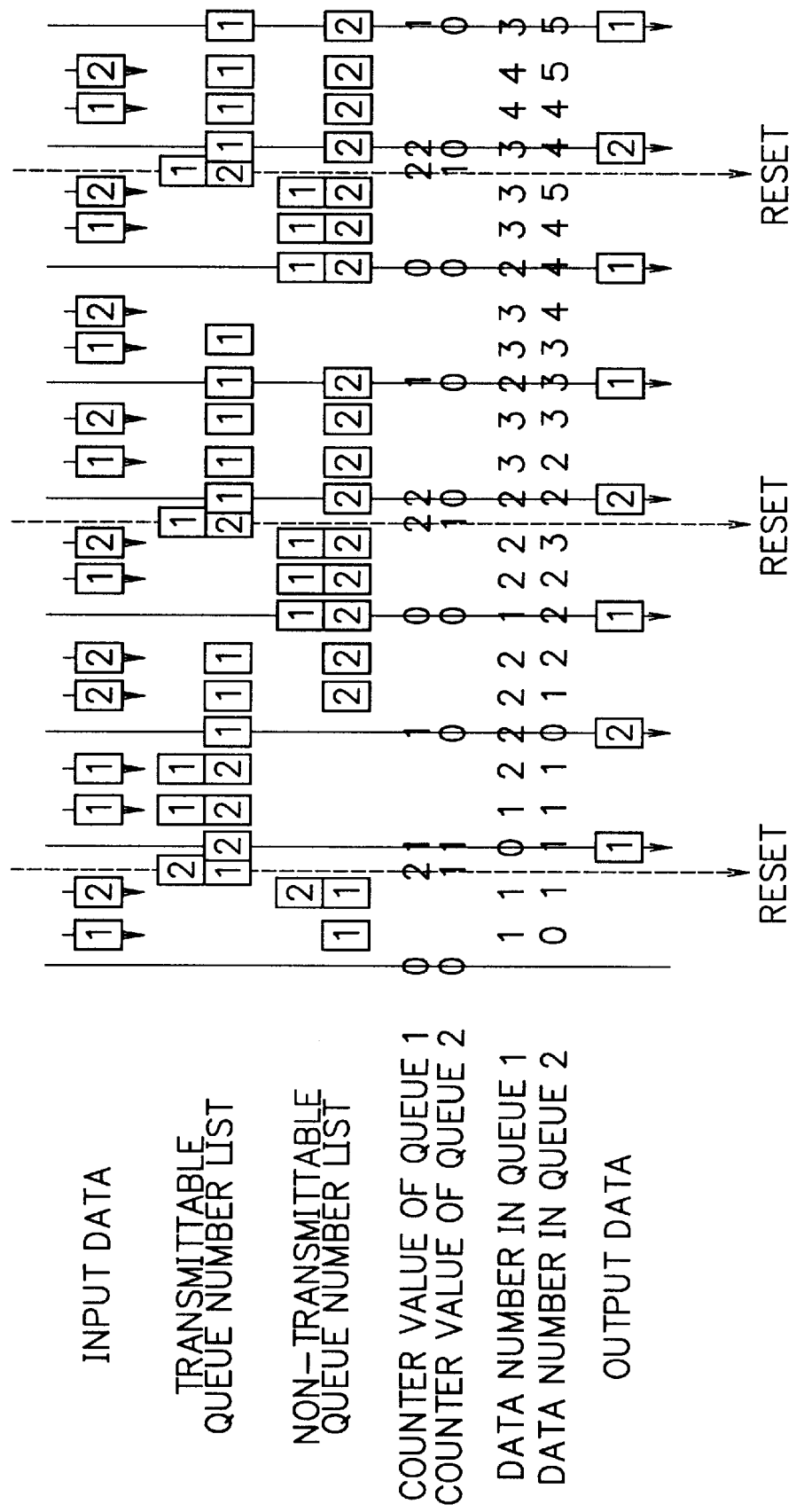
FIG. 5 is a timing chart showing an operation example of the data output control device according to the first embodiment of the present invention.

FIG. 5 is an operation example of the present first embodiment. FIG. 5 shows that how to occur the changes the content of respective lists, the counter value of respective queues, and the data number in respective queues just after accompanying the data input, the data output, and the reset operation. In this place, the number of the queue is set to 2 (two), the weight of the queue 1 is set to 2 (two), the weight of the queue 2 is set to 1 (one). From FIG. 5, it is shown that the data is outputted from both of the queue 1 and the queue 2 in the ratio of 2 (two) to 1 (one).

As described above, according to the present embodiment, there is used both of the transmittable queue number list 30 for holding the number of the queue 13 which has data more than one and whose value of the counter is more than 1 (one), and the non-transmittable queue number list 31 for holding the number of the queue 13 which has data more than one and whose value of the counter is 0 (zero), thereby controlling such that the same queue number exists at most one in the whole list. The present embodiment causes the first problem of Weighted Round Robin system to be resolved by transmitting data from the queue 13 whose number exists in the forefront of the transmittable queue number list 30. The present embodiment also causes the second problem of Weighted Round Robin system to be resolved by implementing decision of the reset due to whether or not the transmittable queue number list 30 is empty.

[SECOND EMBODIMENT]

Figure 6:
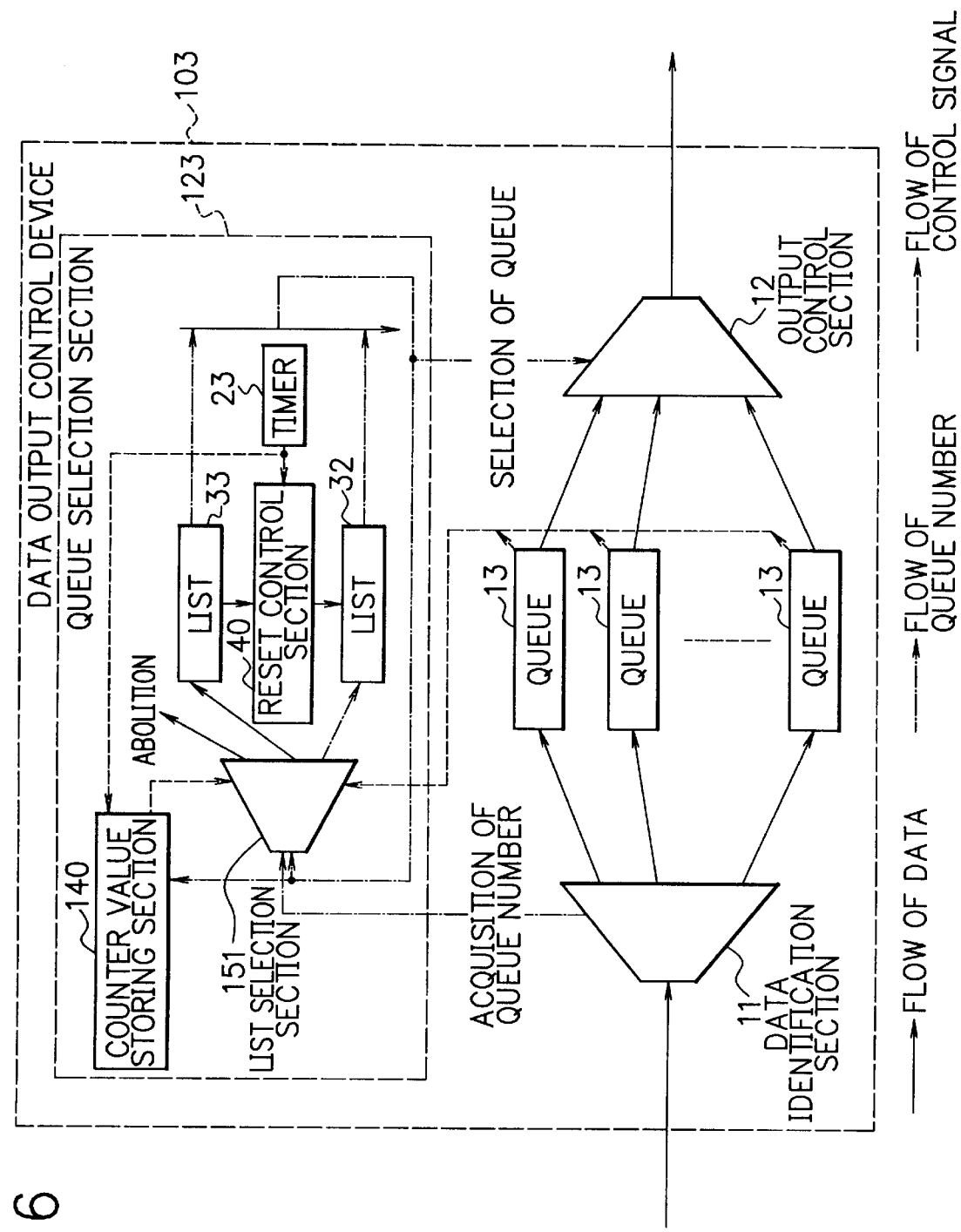
FIG. 6 is a block diagram showing a data output control device according to a second embodiment of the present invention.

FIG. 6 is a block diagram showing a present second embodiment. As shown in FIG. 6, a configuration of the data output control device 103 of the second embodiment is approximately the same as that of the first embodiment. However in the second embodiment, a transmittable priority queue number list 32 substitutes the transmittable queue number list 30, and a transmittable non-priority queue number list 33 substitutes the non-transmittable queue number list 31. In addition thereto, a timer 23 which instructs a list operation at periodic intervals is added.

Figure 7:
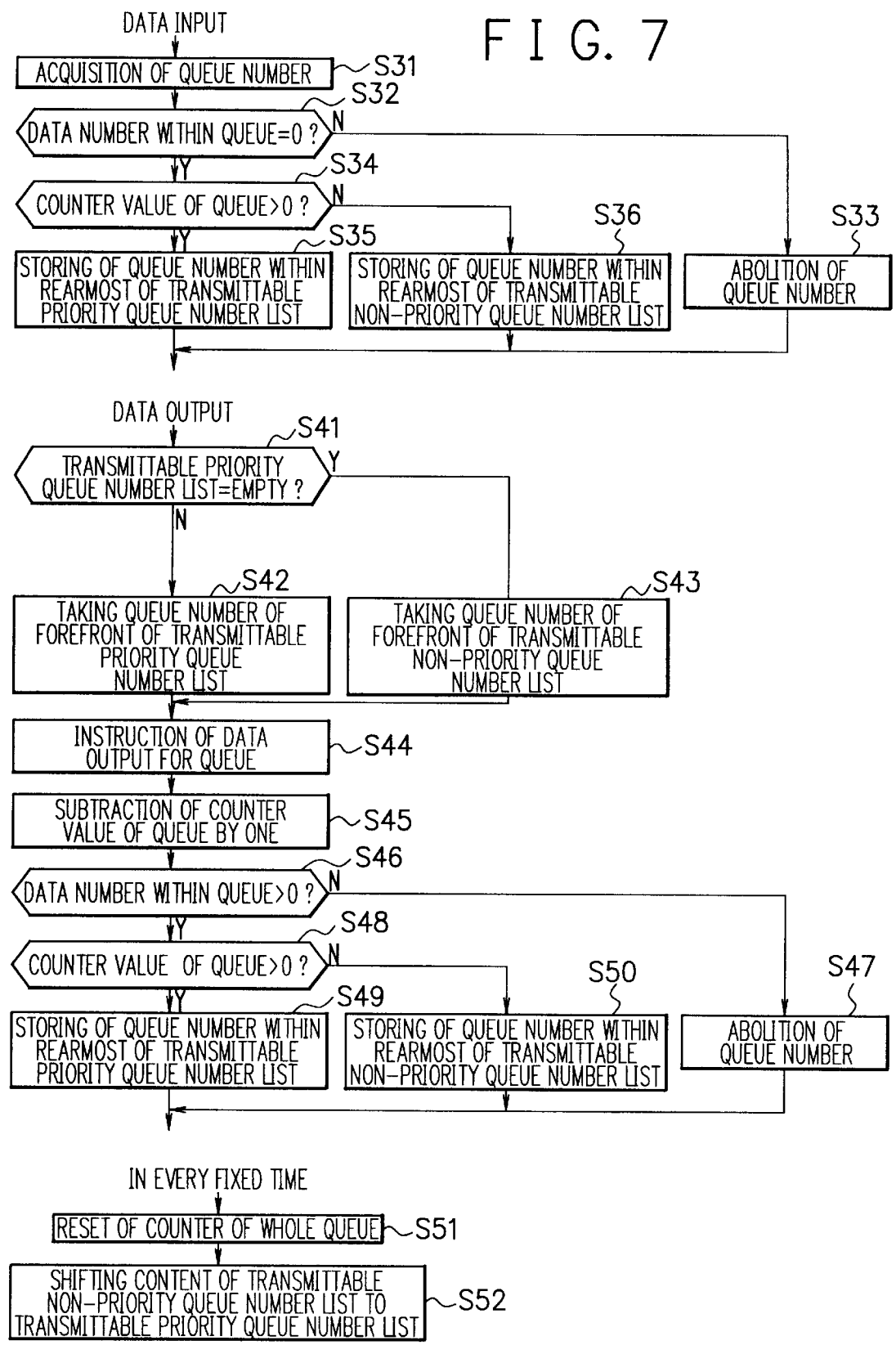
FIG. 7 is a flow chart showing an operation example of a queue selection section in the data output control device according to the second embodiment of the present invention.

FIG. 7 is a flow chart showing operation of the queue selection section 123 in the present second embodiment.

Next, operation of the second embodiment will be described referring to FIGS. 6 and 7.

In the initial state, both of the transmittable priority queue number list 32 and the transmittable non-priority queue number list 33 are empty, and the counters of respective queues 13 are set to the value of the respective weights.

When the input data arrives at the data output control device 103, the input data is stored within the appropriate queue 13 by the data identification section 11, simultaneously, the queue number is transmitted to the queue selection section 123.

When the list selection section 151 in the queue selection section 123 acquires the queue number (S31), if the queue 13 of the queue number possesses data with the exception of the present input data (N of S32), thus discarding the queue number being transmitted (S33), while if the queue 13 of the queue number possesses data which is identical with the present input data (Y of S32), by searching the counter value of the queue (S34), when the value of counter is more than 1 (one) (Y of S34), the list selection section 151 causes the number of the queue 13 to be stored within the rearmost of the transmittable priority queue number list 32 (S35), when the value of counter is 0 (zero) (N of S34), the list selection section 151 causes the number of the corresponding queue 13 to be stored within the rearmost of the transmittable non-priority queue number list 33 (S36).

Next, the queue selection section 123 takes queue number from the forefront of the transmittable priority queue number list 32 in every respective data output times (S42). If the transmittable priority queue number list 32 is empty (Y of S41), the queue selection section 123 takes queue number from the forefront of the transmittable non-priority queue number list 33 instead thereof. The queue number being taken is transmitted to the output control section 12 in the company of an instruction of the data output (S44).

The output control section 12 outputs one of the data to the output circuit while taking one of the data from the queue 13 corresponding to the above-described queue number being taken out.

The list selection section 151 causes the value of the counter of the queue 13 to be subtracted by one (S45), if data number in the queue 13 is 0 (zero) after data output (N of S46), causing the queue number of the queue 13 to be discarded (S47), while if data number in the queue 13 is not 0 (zero) after data output (Y of S46), by searching the counter value of the queue 13 (S48), when the value of counter is more than 1 (one) (Y of S48), thus storing the number of the corresponding queue 13 within the rearmost of the transmittable priority queue number list 30 (S49), when the value of counter is 0 (zero) (N of S48), thus storing the number of the queue 13 within the rearmost of the transmittable non-priority queue number list 33 (S50).

The reset operation is implemented regularly by the timer 23. The reset operation is implemented in such a way that the reset control section 40 causes the counter of whole queues 13 in the counter value storing section 140 to be returned to the value of respective weights (S51), and causes the whole content of the transmittable non-priority queue number list 33 to be shifted to the transmittable priority queue number list 32 (S52).

Figure 8:
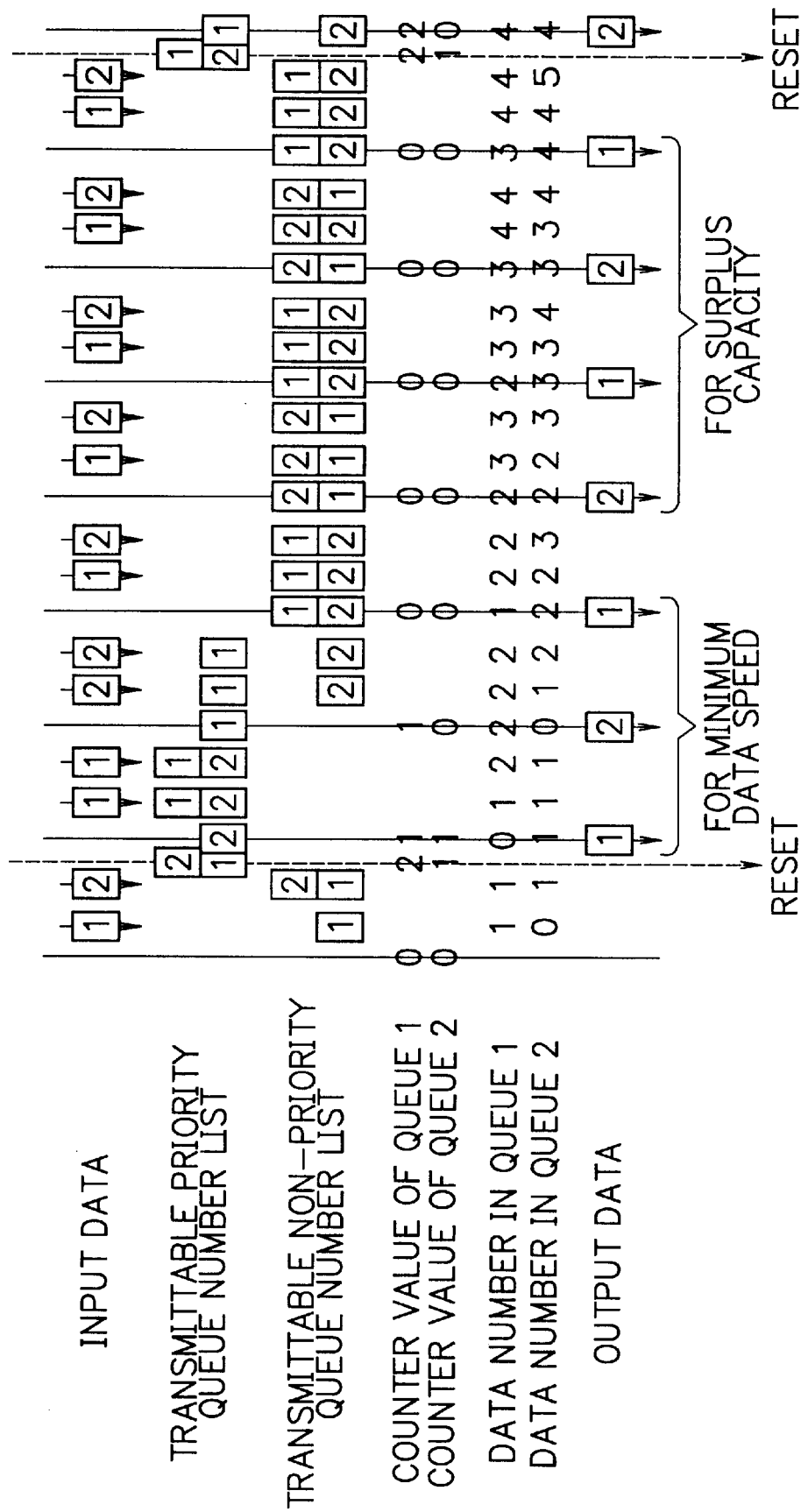
FIG. 8 is a timing chart showing an operation example of the data output control device according to the second embodiment of the present invention.

FIG. 8 shows an operation example of the present second embodiment. FIG. 8 shows concretely that how to occur the changes the content of respective lists, the counter value of respective queues, and the data number in respective queues just after accompanying the data input, the data output, and the reset operation. In this place, the number of the queue is set to 2 (two), the weight of the queue 1 is set to 2 (two), the weight of the queue 2 is set to 1 (one), and reset intervals are set to 7 (seven) data output times.

According to FIG. 8, it is shown that the queues 1 and 2 output two and one of the data respectively by way of the minimum data speed guarantee, before transmitting data in the equivalent ratio until next reset.

As described above, according to the present embodiment, there is used the transmittable priority queue number list 32 for holding the number of the queue 13 which has data more than one and whose value of the counter is more than 1 (one), thus data transmission is implemented in such a way that the queue whose value of the counter is more than 1 (one) as priority state is given priority over the queue 13 whose value of the counter is 0 (zero). Further there is used the transmittable non-priority queue number list 33 for holding the number of queue which has data more than one and whose value of the counter is 0 (zero), thus implementing data transmission equivalently at the respective queues 13 from the queue 13 whose value of the counter is 0 (zero), subsequently, implementing the reset operation periodically. Thereby, the second embodiment guarantees the minimum data speed to respective queues 13, and allocates surplus capacity of the output circuit equally, thus enabling the fifth problem of Weighted Round Robin to be resolved.

Furthermore, in the present second embodiment, even if there exists the queue with priority state, the queue is incapable of outputting the data if the queue is empty, however, since the second embodiment is capable of outputting the data from the queue without priority state so that it is capable of being used the capacity of the output circuit efficiently.

Moreover, the present second embodiment causes the first problem of Weighted Round Robin system to be resolved by transmitting data from the queue 13 whose number exists in the forefront of the transmittable priority queue number list 32. The present second embodiment also causes the second problem of Weighted Round Robin system to be resolved by implementing reset operation periodically.

[THIRD EMBODIMENT]

FIG. 9 is a block diagram showing a present third embodiment. As shown in FIG. 9, a configuration of the data output control device 103 of the present third embodiment is approximately the same as that of the second embodiment. However the non-transmittable queue number list 31 is added thereto. Further, information of the propriety of usage of the surplus capacity in terms of the respective queues is added in the counter value storing section 141.

Figure 10:
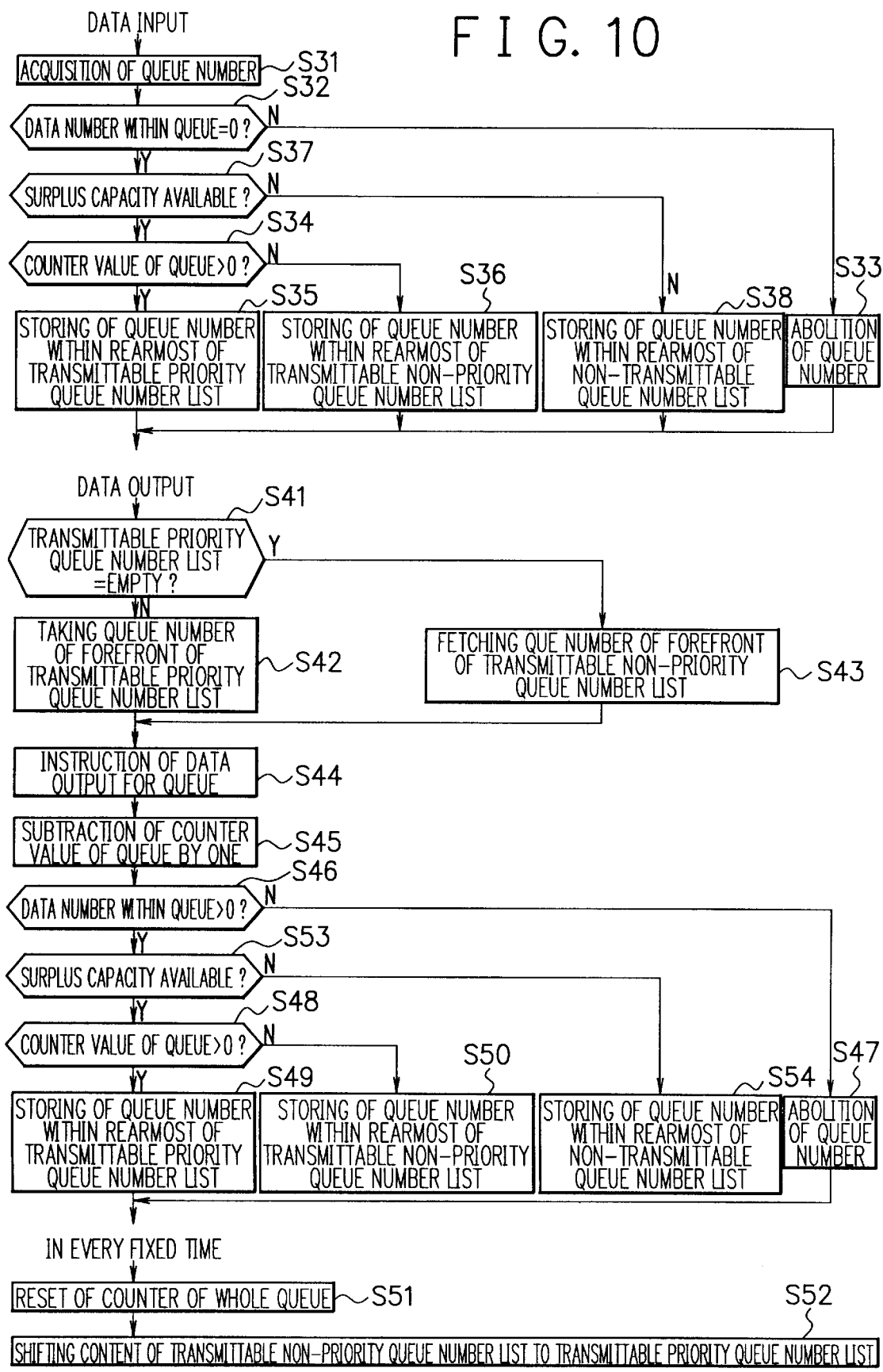
FIG. 10 is a flow chart showing an operation example of a queue selection section in the data output control device according to the third embodiment of the present invention.

FIG. 10 is a flow chart showing operation of the queue selection section 123 in the present third embodiment. Steps S37, S38, S53, and S54 are added to the flow chart of FIG. 7. Further, contents of the step S52 is changed.

Next, operation of the present third embodiment will be described referring to FIGS. 9 and 10.

In the initial state, the non-transmittable queue number list 31, the transmittable priority queue number list 32 and the transmittable non-priority queue number list 33 are empty, and the counter values of respective queues 13 are set to the value of the respective weights.

When the input data arrives at the data output control device 103, the input data is stored within the appropriate queue 13 by means of the data identification section 11, simultaneously, the queue number is transmitted to the queue selection section 123.

When the list selection section 151 in the queue selection section 123 acquires the queue number (S31), if the queue 13 of the queue number possesses data with the exception of the present input data (N of S32), discarding the queue number being transmitted (S33), while if the queue 13 of the queue number possesses data which is identical with the present input data (Y of S32), by searching information in connection with the propriety of usage of the surplus capacity of the queue (S37), if it is non-available (N of S37), the list selection section 151 stores the number of the queue within the rearmost of the non-transmittable queue number list 31 (S38). If the queue is capable of using the surplus capacity (Y of S37), by searching the counter value of the queue (S34), when the value of counter is more than 1 (one)

(Y of S34), the list selection section 151 causes the number of the queue 13 to be stored within the rearmost of the transmittable priority queue number list 32 (S35), when the value of counter is 0 (zero) (N of S34), the list selection section 151 causes the number of the queue 13 to be stored within the rearmost of the transmittable non-priority queue number list 33 (S36).

Next, the queue selection section 123 takes the queue number from the forefront of the transmittable priority queue number list 32 in every respective data output times (S42). If the transmittable priority queue number list 32 is empty (Y of S41), the queue selection section 123 takes the queue number from the forefront of the transmittable non-priority queue number list 33 instead thereof. The queue number being taken is transmitted to the output control section 12 in conjunction with an instruction of the data output (S44).

The output control section 12 causes one of the data to be taken from the queue 13 corresponding to the queue number being taken to output to the output circuit.

The list selection section 151 causes the value of the counter of the queue 13 to be subtracted by one (S45), and if the number of data in the queue 13 is 0 (zero) after data output (N of S46), thus causing the queue number of the queue 13 to be discarded (S47), while if data number in the queue 13 is not 0 (zero) after data output (Y of S46), by searching the information in terms of propriety of usage of the surplus capacity of the queue (S53), if it is non-available (N of S53), causing the number of the queue to be stored within the rearmost of the non-transmittable queue number list 31 (S54). While if the queue is capable of using the surplus capacity (Y of S53), by searching the counter value of the queue 13 (S48), when the value of counter is more than 1 (one) (Y of S48), thus storing the number of the queue 13 within the rearmost of the transmittable priority queue number list 30 (S49), when the value of counter is 0 (zero) (N of S48), thus storing the number of the queue 13 within the rearmost of the transmittable non-priority queue number list 33 (S50).

The reset operation is implemented periodically by the timer 23. The reset operation is implemented in such a way that the reset control section 40 causes the counter of whole queue 13 in the counter value storing section 140 to be returned to the value of respective weights (S51), and causes the whole content of the transmittable non-priority queue number list 33 to be shifted to the transmittable priority queue number list 32 (S52).

Figure 11:
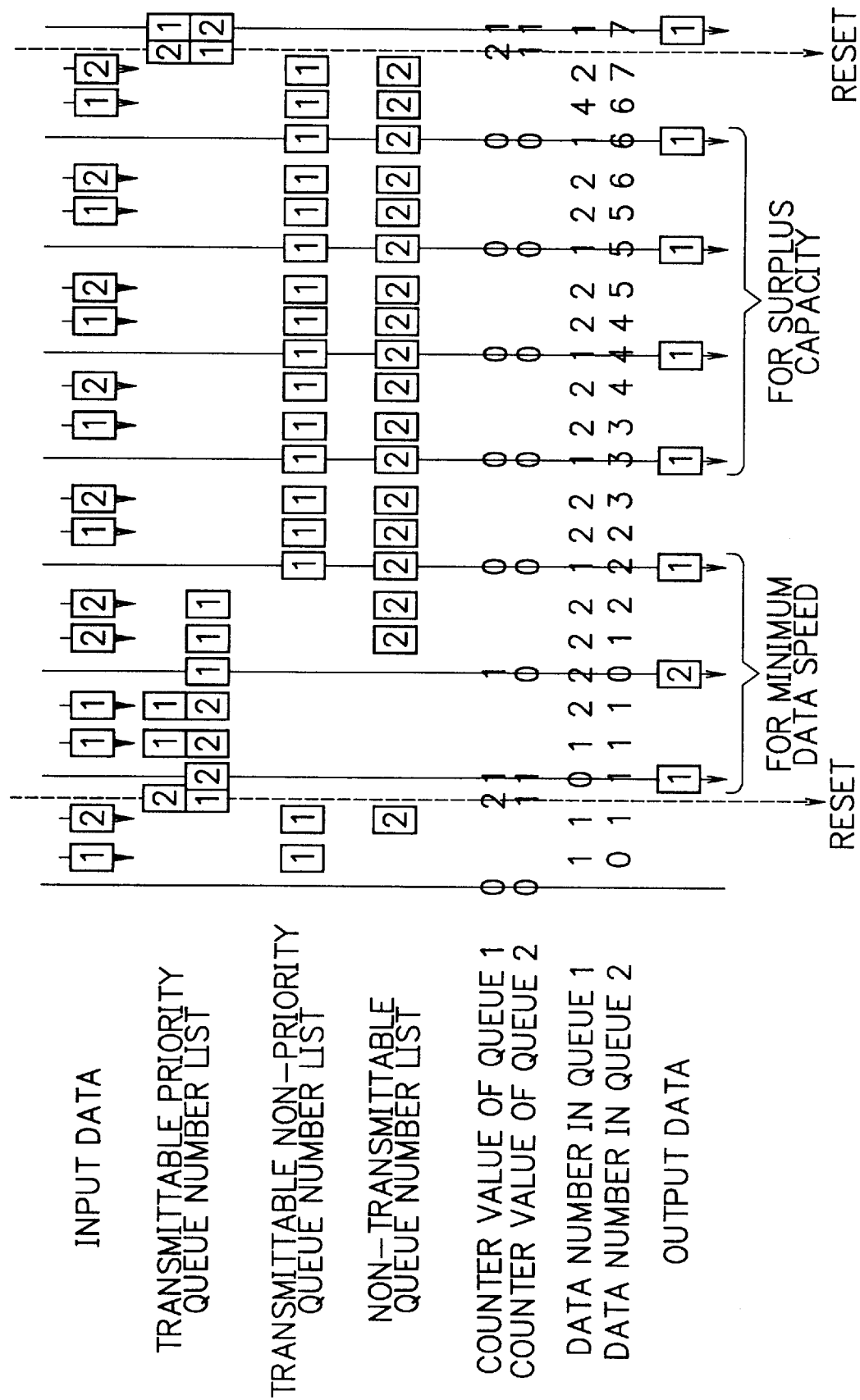
FIG. 11 is a timing chart showing an operation example of the data output control device according to the third embodiment of the present invention.

FIG. 11 shows an operation example of the present third embodiment. FIG. 11 shows that how to occur the changes the content of respective lists, the counter value of respective queues, and the data number in respective queues just after accompanying with the data input, the data output, and the reset operation. In this place, the number of the queue is set to 2 (two), the weight of the queue 1 is set to 2 (two), the weight of the queue 2 is set to 1 (one), and reset intervals are set to 7 (seven) data output times. Further, the queue 1 is capable of using the surplus capacity, while the queue 2 is incapable of using the surplus capacity. According to FIG. 11, it is shown that the queues 1 and 2 output two and one of the data respectively for the minimum data speed guarantee, before transmitting data from only the queue 1 which is capable of using the surplus capacity.

Thus the present third embodiment resolves the first and the second problems of Weighted Round Robin system on an equality with the second embodiment, furthermore, resolves the fifth problem in such a way that it causes the surplus capacity of the output circuit not to be provided to the specific queue, but it causes the surplus capacity of the output circuit to be allocated equally to the another queues.

[FOURTH EMBODIMENT]

Figure 12:
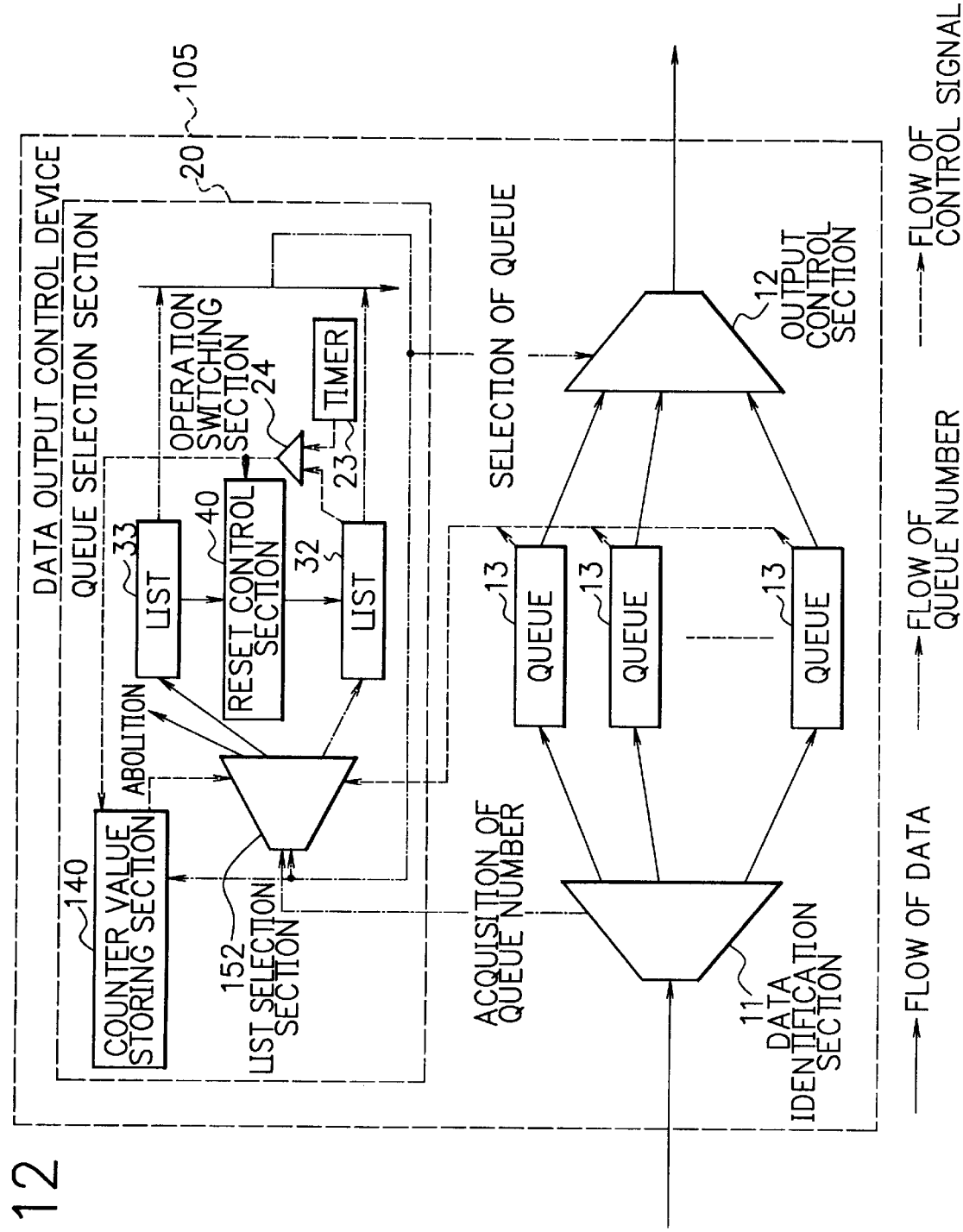
FIG. 12 is a block diagram showing a data output control device according to a fourth embodiment of the present invention.

FIG. 12 is a block diagram showing a fourth embodiment. As shown in FIG. 12, a configuration of the data output control device 105 is approximately the same as that of the second embodiment. However, an operation switching section 24 is added.

Figure 13:
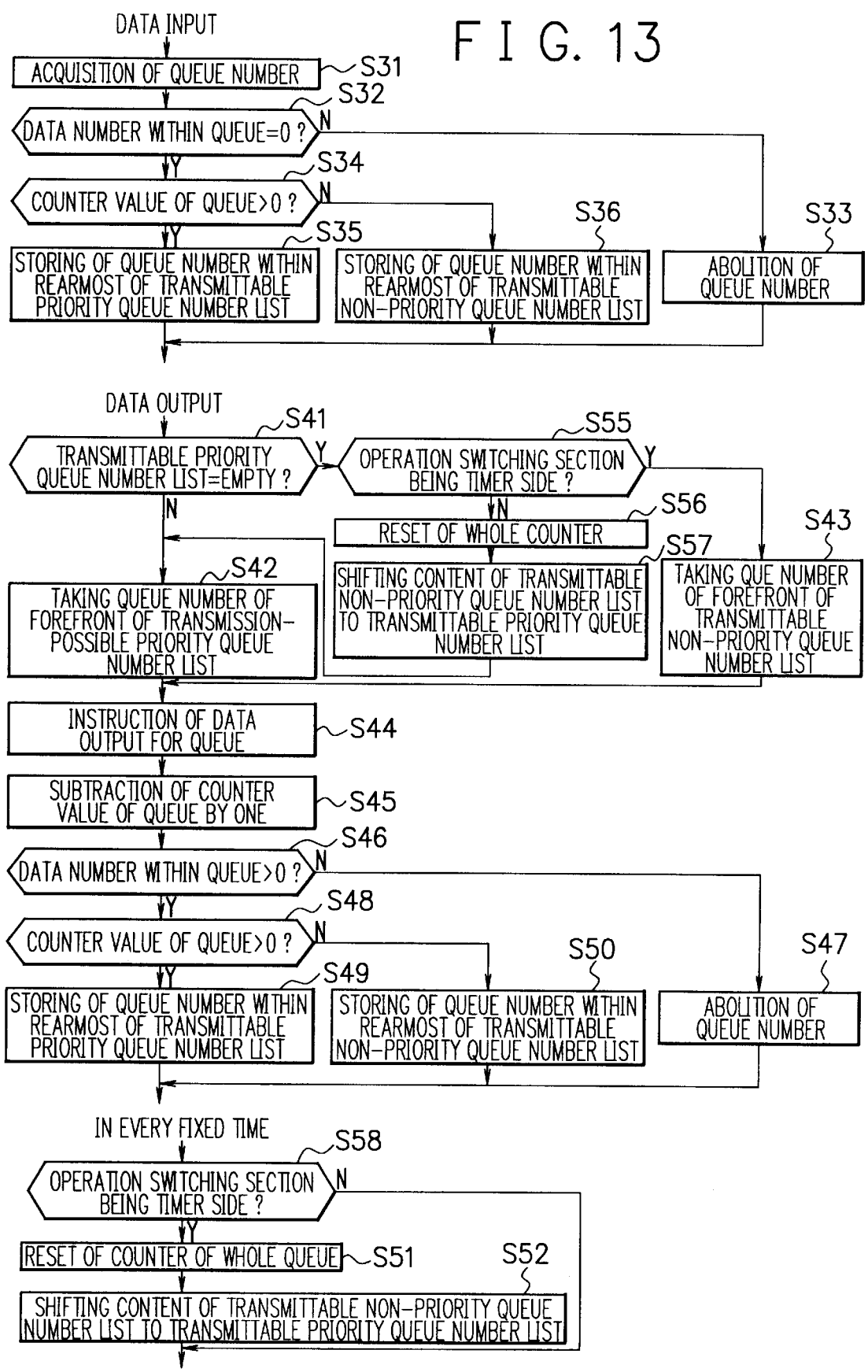
FIG. 13 is a flow chart showing an operation example of the queue selection section in the data output control device according to the fourth embodiment of the present invention.

FIG. 13 is a flow chart showing operation of the queue selection section 20 according to the present fourth embodiment. Steps S55 to S58 are added to the flow chart of FIG. 7.

Next, operation of the present fourth embodiment will be described referring to FIGS. 12 and 13.

In the initial state, both of the transmittable priority queue number list 32 and the transmittable non-priority queue number list 33 are empty, and the counters of respective queues 13 are set to the value of the respective weights.

When the input data arrives at the data output control device 105, the input data is stored within the appropriate queue 13 by the data identification section 11, simultaneously, the queue number is transmitted to the queue selection section 20.

When the list selection section 152 in the queue selection section 20 acquires the queue number (S31), if the queue 13 of the queue number possesses data with the exception of the present input data (N of S32), discarding the queue number being transmitted (S33), while if the queue 13 of the queue number possesses data which is identical with the present input data (Y of S32), by searching the counter value of the queue (S34), when the value of counter is more than 1 (one) (Y of S34), the list selection section 151 causes the number of the queue 13 to be stored within the rearmost of the transmittable priority queue number list 32 (S35), when the value of counter is 0 (zero) (N of S34), the list selection section 151 causes the number of the queue 13 to be stored within the rearmost of the transmittable non-priority queue number list 33 (S36).

Next, the queue selection section 20 takes the queue number from the forefront of the transmittable priority queue number list 32 in every respective data output times (S42). If the transmittable priority queue number list 32 is empty (Y of S41), by searching whether or not the operation switching section 24 causes the timer 23 to be set so as to implement reset operation in every constant time intervals (S55), if the reset operation by the timer is set (Y of S55), at this time, the reset operation is not implemented, but the queue selection section 20 takes the queue number from the forefront of the transmittable non-priority queue number list 33 instead thereof (S43). When there is set the reset operation at the operation switching section 24 that it causes the reset operation to be implemented in cases where there is no data in the transmittable priority queue number list 32 (N of S55), the reset control section 40 causes the counter of the whole queues 13 in the counter value storing section 140 to be returned to respective value of the weights (S56), further, whole content of the transmittable non-priority queue number list 33 is shifted to the transmittable priority queue number list 32 (S57), after implementing these reset operations, thus taking the queue number from the forefront of the transmittable priority queue number list 32 (S42). The queue number being taken is transmitted to the output control section 12 in conjunction with an instruction of the data output (S44).

The output control section 12 causes one of the data to be taken from the queue 13 corresponding to the queue number being taken to output to the output circuit.

The list selection section 152 causes the value of the counter of the queue 13 to be subtracted by one (S45), if data number in the queue 13 is 0 (zero) after data output (N of S46), causing the queue number of the queue 13 to be discarded (S47), while if data number in the queue 13 is not 0 (zero) after data output (Y of S46), by searching the counter value of the queue 13 (S48), when the value of counter is more than 1 (one) (Y of S48), thus storing the number of the queue 13 within the rearmost of the transmittable priority queue number list 30 (S49), when the value of counter is 0 (zero) (N of S48), thus storing the number of the queue 13 within the rearmost of the transmittable non-priority queue number list 33 (S50).

The queue selection section 20 searches whether or not the operation switching section 24 causes the timer 23 to be set so as to implement reset operation in every fixed time intervals whenever the timer 23 clocks fixed period of time (S58), if the timer 23 is set to implement reset operation in every fixed time intervals (Y of S58), implementing reset operation. When the reset operation is implemented, the reset control section 40 causes the counter of the whole queues 13 in the counter value storing section 140 to be returned to the value of respective weights (S51), further, whole contents of the transmittable non-priority queue number list 33 are shifted to the transmittable priority queue number list 32 (S52).

In the present fourth embodiment, when the operation switching section 24 causes the reset operation to be implemented in cases where there is no data in the transmittable priority queue number list 32, the reset operation is implemented due to the above described phenomena before data is transmitted by the transmittable non-priority queue number list 33, thus the fourth embodiment implements the same operation as that of the first embodiment. Further, when the operation switching section 24 causes the timer to be set so as to implement the reset operation in every fixed time intervals, the present fourth embodiment implements the same operation as that of the second embodiment.

Thus the present fourth embodiment is capable of realizing both of the operation of the first embodiment and the operation of the second embodiment by one device, because the operation switching section 24 causes the reset operation to be switched.

Also the present fourth embodiment is capable of realizing both of the operation of the first embodiment and the operation of the third embodiment by one device because of switching of the reset operation depend on the operation switching section while applying idea of the present fourth embodiment to the third embodiment.

[FIFTH EMBODIMENT]

Figure 14:
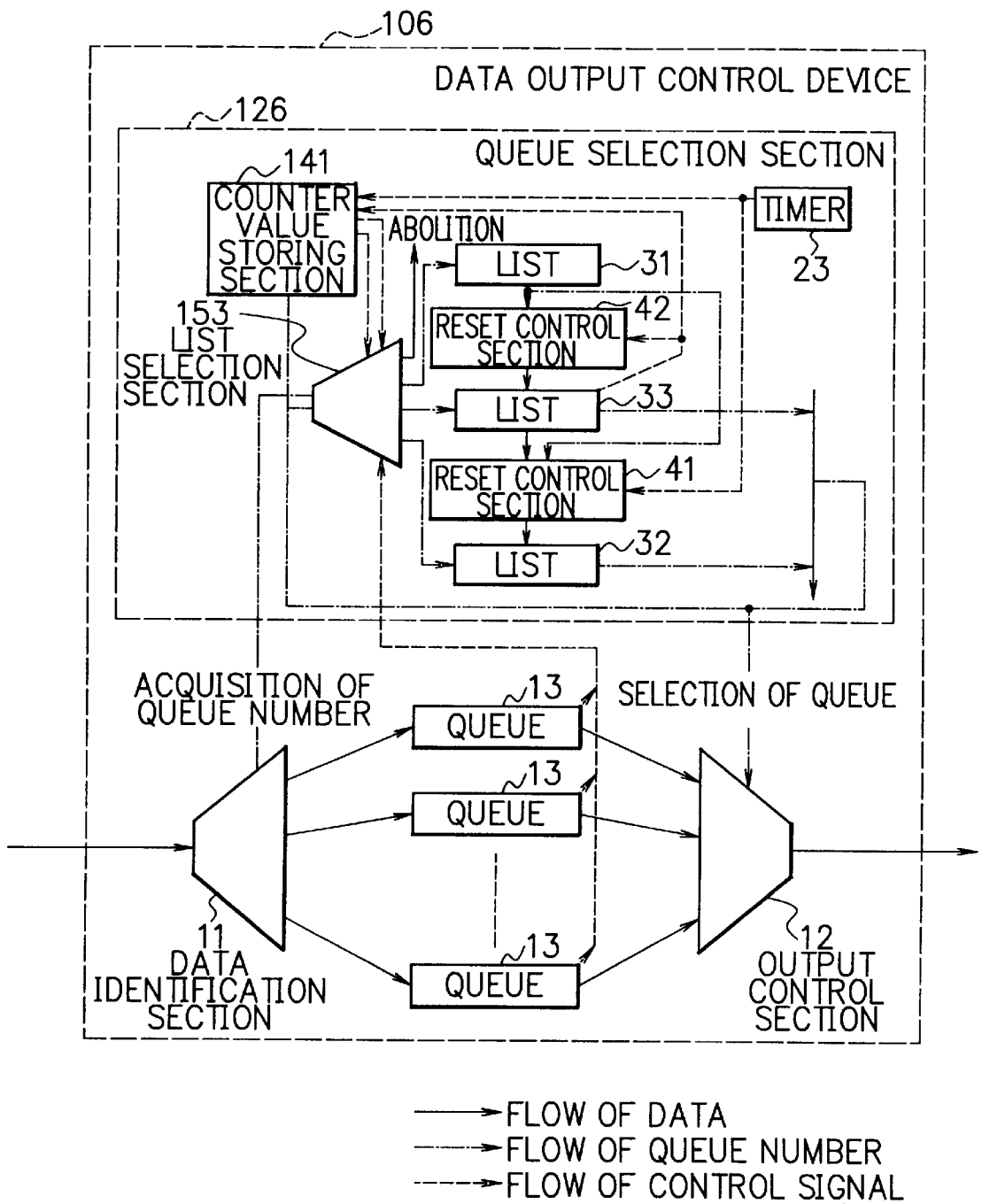
FIG. 14 is a block diagram showing a data output control device according to a fifth embodiment of the present invention.

FIG. 14 is a block diagram showing a present fifth embodiment. As shown in FIG. 14, a data output control device 106 comprises a plurality of queues 13, a data identification section 11 for implementing identification of data which arrives thereto to store it within the appropriate queue 13, a queue selection section 126 for selecting the queue 13 which is to output the data, and an output control section 12 for outputting one of the data to an output circuit while taking one of the data from the queue 13 according to the instruction of the queue selection section 126.

Further, the queue selection section 126 comprises a counter value storing section 141 for holding a weight for guaranteeing minimum data, a weight for surplus capacity, a value of the counter, and priority of the queue in every respective queues 13, a transmittable priority queue number list 32 which has data more than one, whose value of the counter is more than 1 (one), and for holding the number of the queue which is of the priority state, a transmittable non-priority queue number list 33 which has the data more than one, whose value of the counter is more than 1 (one), and for holding the number of the queue which is of the non-priority state, an non-transmittable queue number list 31 which has the data more than one, and for holding the number of the queue whose value of the counter is 0 (zero), a list selection section 153 which receives the number of the queue 13 within which the data is stored from the data identification section 11, and which causes the number to be stored within the appropriate list or causes the number to be discarded, a whole queue reset control section 41 for implementing the reset operation of the list, and a non-priority queue reset control section 42.

Figure 15:
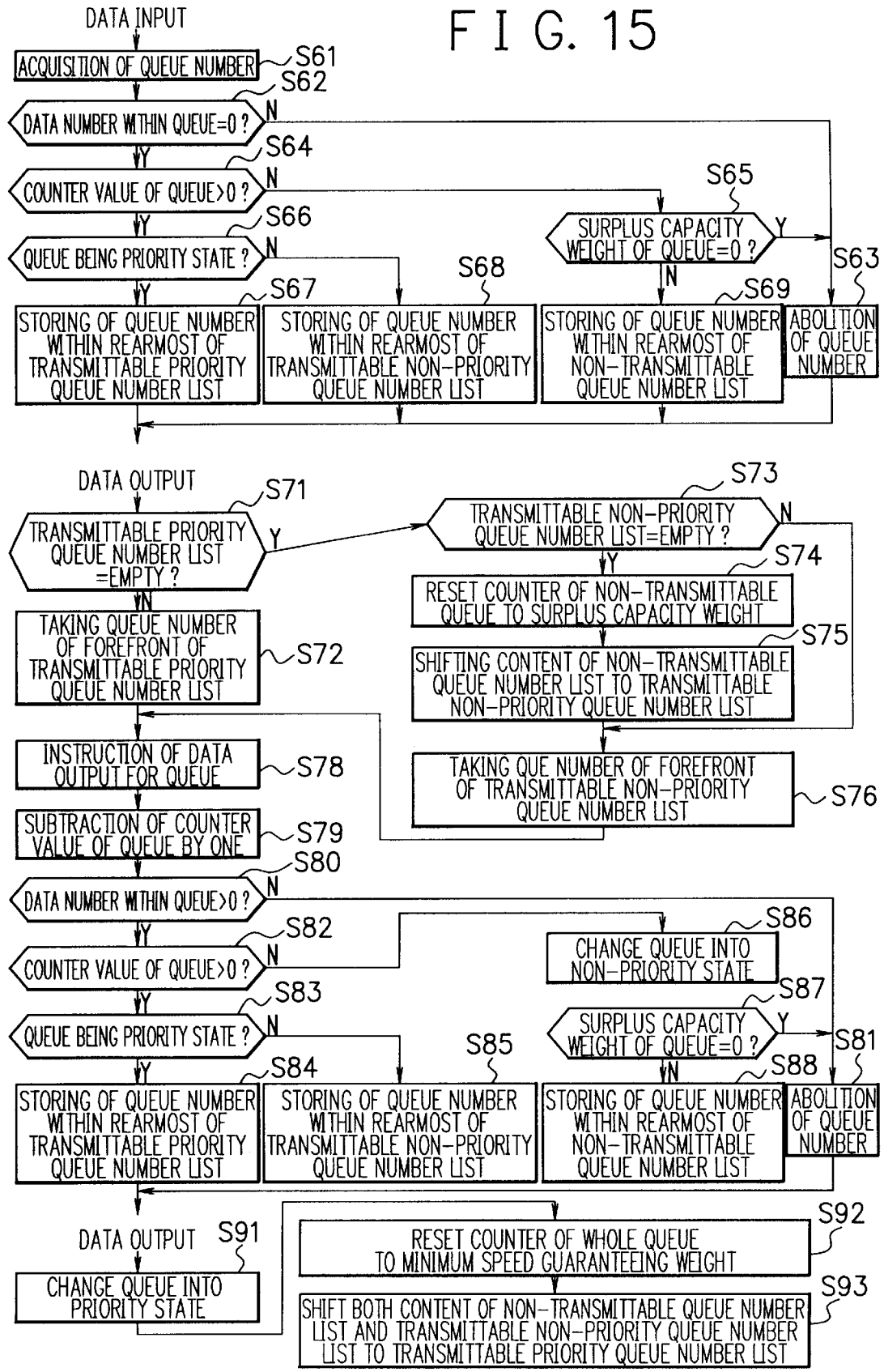
FIG. 15 is a flow chart showing an operation example of the queue selection section in the data output control device according to the fifth embodiment of the present invention.

FIG. 15 is a flow chart showing an operation example of the queue selection section 126 according to the present fifth embodiment.

Next, operation of the present fifth embodiment will be described referring to FIGS. 14 and 15.

In the initial state, respective lists 31, 32, and 33 are of wholly empty state, respective queues 13 are of the priority state, and the counter value thereof are set to the values of the weight for guaranteeing minimum data speed.

When the input data arrives at the data output control device 106, the input data is stored within the appropriate queue 13 by the data identification section 11, simultaneously, the queue number is transmitted to the queue selection section 126.

The list selection section 153 in the queue selection section 126 takes a queue (S61), if the queue 13 of the queue number possesses the data with the exception of the present input data (N of S62), or even though the queue 13 of the queue number does not possess the data with the exception of the present input data (Y of S62), if both of the counter value of the queue and the weight for surplus capacity are 0 (zero) (N of S64, Y of S65), thus discarding the transmitted queue number (S63), while if the counter value of the queue is 0 (zero) and the weight for surplus capacity is not 0 (zero) (N of S64, N of S65), the list selection section 153 causes the transmitted queue number to be stored within the rearmost of the non-transmittable queue number list 31 (S69).

On the other hand, when the queue 13 of the queue number does not possess the data with the exception of the present input data (Y of S62), and the counter value thereof is more than 1 (one) (Y of S64), the list selection section 153 searches whether or not the queue is of the priority state (S66), if the queue is of the priority state (Y of S66), the list selection section 153 causes the number of the queue 13 to be stored within the rearmost of the transmittable priority queue number list 32 (S67), while if the queue is not the priority state (N of S66), the list selection section 153 causes the number of the queue 13 to be stored within the rearmost of the transmittable non-priority queue number list 33 (S68).

Next, the queue selection section 126 takes the queue number from the forefront of the transmittable priority queue number list 32 in every respective data output times (S72). However, if the transmittable priority queue number list 32 is empty (Y of S71), the queue selection section 126 takes the queue number from the forefront of the transmittable non-priority queue number list 33 (S76). Furthermore, if the transmittable non-priority queue number list 33 is empty (Y of S73), the queue selection section 126 implements the reset operation in relation to the non-priority queue (S74, S75), before taking the queue number from the forefront of the transmittable non-priority queue number list 33 (S76). In the reset operation in relation to the non-priority state queue, the reset operation is implemented in such a way that the reset control section 42 causes the content of the non-transmittable queue number list 31 to be shifted to the transmittable non-priority queue number list 33, and that the reset control section 42 causes the value of the counter of the queue which is of the non-transmittable in the counter value storing section 141 to be set to the weight for surplus capacity (S74, S75). The above-described number list which is taken is transmitted to the output control section 12 in conjunction with the instruction of the data output (S78).

The output control section 12 causes the one of the data to be taken from the queue 13 corresponding to the queue number taken to output to the output circuit.

The list selection section 153 causes one counter value of the queue 13 to be subtracted (S79), when the data number of the queue 13 is 0 (zero) after data outputting (N of S80), or if not 0 (zero) (Y of S80), if both of the counter value of the queue and the weight for surplus capacity are 0 (zero) (N of S82, Y of S87), discarding the transmitted queue number (S81), while if the counter value of the queue is 0 (zero) and the weight for surplus capacity is not 0 (zero) (N of S82, N of S87), the list selection section 153 causes the transmitted queue number to be stored within the rearmost of the non-transmittable queue number list 31 (S88). At this time (when the counter value is 0), the list selection section 153 causes the queue to occur the changes into non-priority state (S86). Furthermore, if the counter value of the queue is more than 1 (one) (Y of S82), by searching whether or not the queue is of the priority state (S83), if the queue is of the priority state (Y of S83), the list selection section 153 causes the number of the queue 13 to be stored within the rearmost of the transmittable priority queue number list 32 (S84), while if the queue is of the non-priority state (N of S83), the list selection section 153 causes the number of the queue 13 to be stored within the rearmost of the transmittable non-priority queue number list (S85).

The reset operation in relation to the whole queues is implemented by means of the timer 23 periodically. At the time of the reset operation, the reset control section 41 causes the whole queues to be the priority state (S91), and causing the counter value of the whole queue 13 to be returned to the value of the minimum data speed guaranteeing weight respectively (S92), subsequently, it causes the whole content both of the non-transmittable queue number list 31 and the transmittable non-priority queue number list 33 to be shifted to the transmittable priority queue number list 32 (S93).

Figure 16:
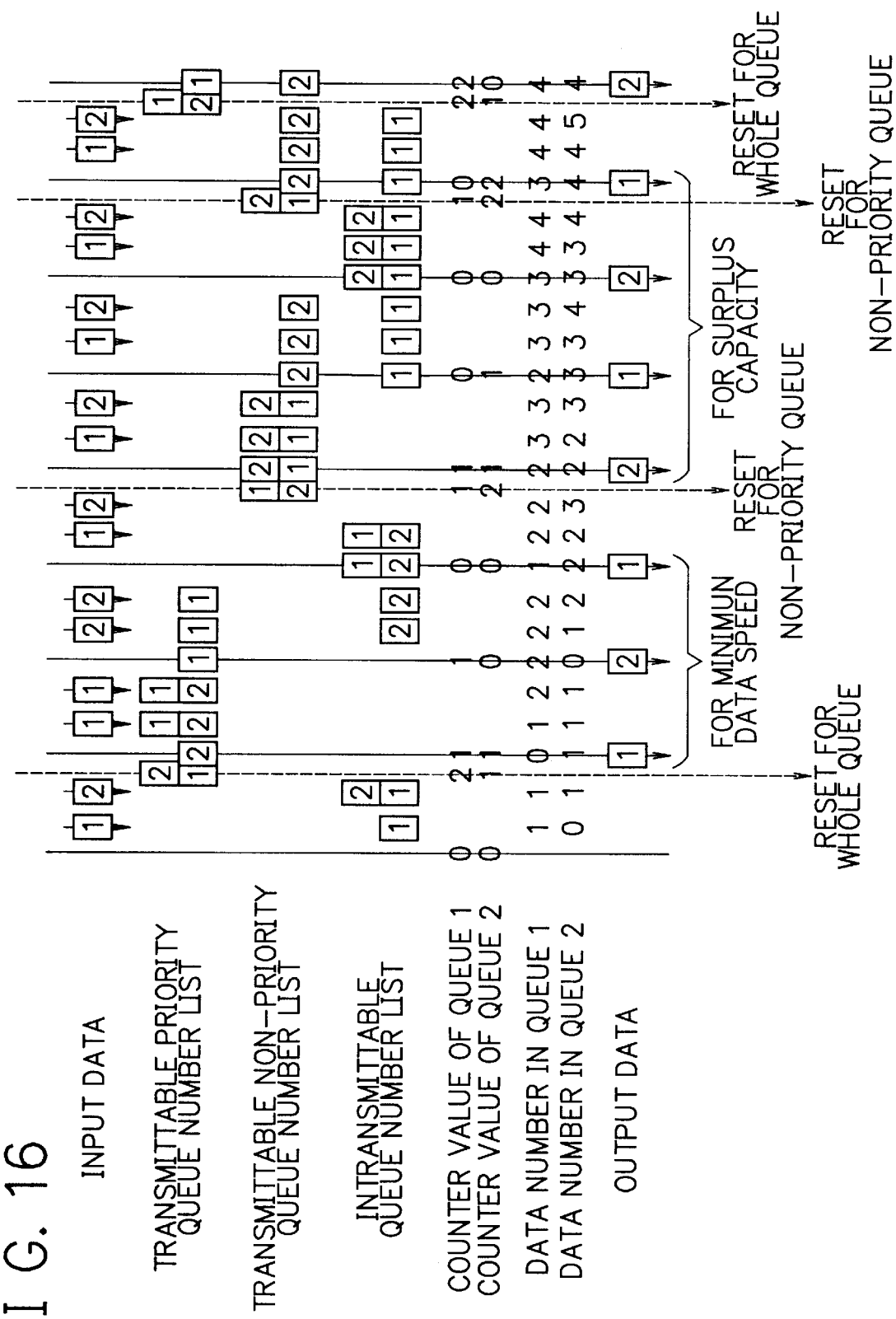
FIG. 16 is a timing chart showing an operation example of the data output control device according to the fifth embodiment of the present invention.

FIG. 16 shows an operation example of the present second embodiment. FIG. 16 shows that how to occur the changes the content of respective lists, the counter value of respective queues, and the data number in respective queues just after accompanying with the data input, the data output, and the reset operation. In this place, the number of the queue is set to 2 (two), the weight for the minimum data speed guaranty of the queue 1 is set to 2 (two), the weight for the surplus capacity is set to 1 (one), the weight for the minimum data speed guaranty of the queue 2 is set to 1 (one), and the weight of the surplus capacity is set to 2 (two). Further, reset intervals for the minimum data speed guaranty are set to 7 (seven) data output times. According to FIG. 16, it is shown that the queues 1 and 2 output two and one of the data respectively for the minimum data speed guaranty, before transmitting data in the ratio of 1 (one) to 2 (two) until next reset.

Thus, the present fifth embodiment implements data transmission from the queue of the priority state in preference to the other, while using the transmittable priority queue number list 32 which has data more than 1 (one) and whose value of the counter is more than 1 (one) and which holds the number of the queue of the priority state. The present fifth embodiment implements data transmission from the queue of the non-priority state with voluntary ratio, while using both of the transmittable non-priority queue number list 33 which has data more than 1 (one) and whose value of the counter is more than 1 (one), and which holds the number of the queue of the non-priority state, and the non-transmittable queue number list 31 which has the data more than 1 (one) and holds the number of the queue whose counter value is 0 (zero). The present fifth embodiment implements the reset operation in terms of the whole queue periodically in order to guarantee the minimum data speed. Also, the present fifth embodiment implements the reset operation in relation to the queue of the non-priority state in every time when the transmittable non-priority queue number list 33 becomes empty in order to divide the surplus capacity of the output circuit into respective queues with voluntary ratio. Thus, the present fifth embodiment resolves the fifth problem of the Weighted Round Robin system, and further, resolves the first and the second problems similarly to the second embodiment.

Moreover, the present fifth embodiment implements the same operation as that of the first embodiment by the fact that the cycle of the reset operation in terms of the whole queue is set to infinity, and causing the weight for the minimum data speed guaranty to be set to the weight for the surplus capacity. The present fifth embodiment implements the same operation as that of the second embodiment by the fact that it causes the cycle of the reset operation in terms of the whole queue to be set to the appropriate time intervals, and setting the whole weights for the surplus capacity to 1 (one). The present fifth embodiment implements the same operation as that of the third embodiment by the fact that it causes the cycle of the reset operation in terms of the whole queue to be set to the appropriate time intervals, causing the weight for the surplus capacity to be set to 1 (one) in relation to the queue which is capable of using the surplus capacity, and causing the weight for the surplus capacity to be set to 0 (zero) in relation to the queue which is incapable of using the surplus capacity.

[SIXTH EMBODIMENT]

Figure 17:
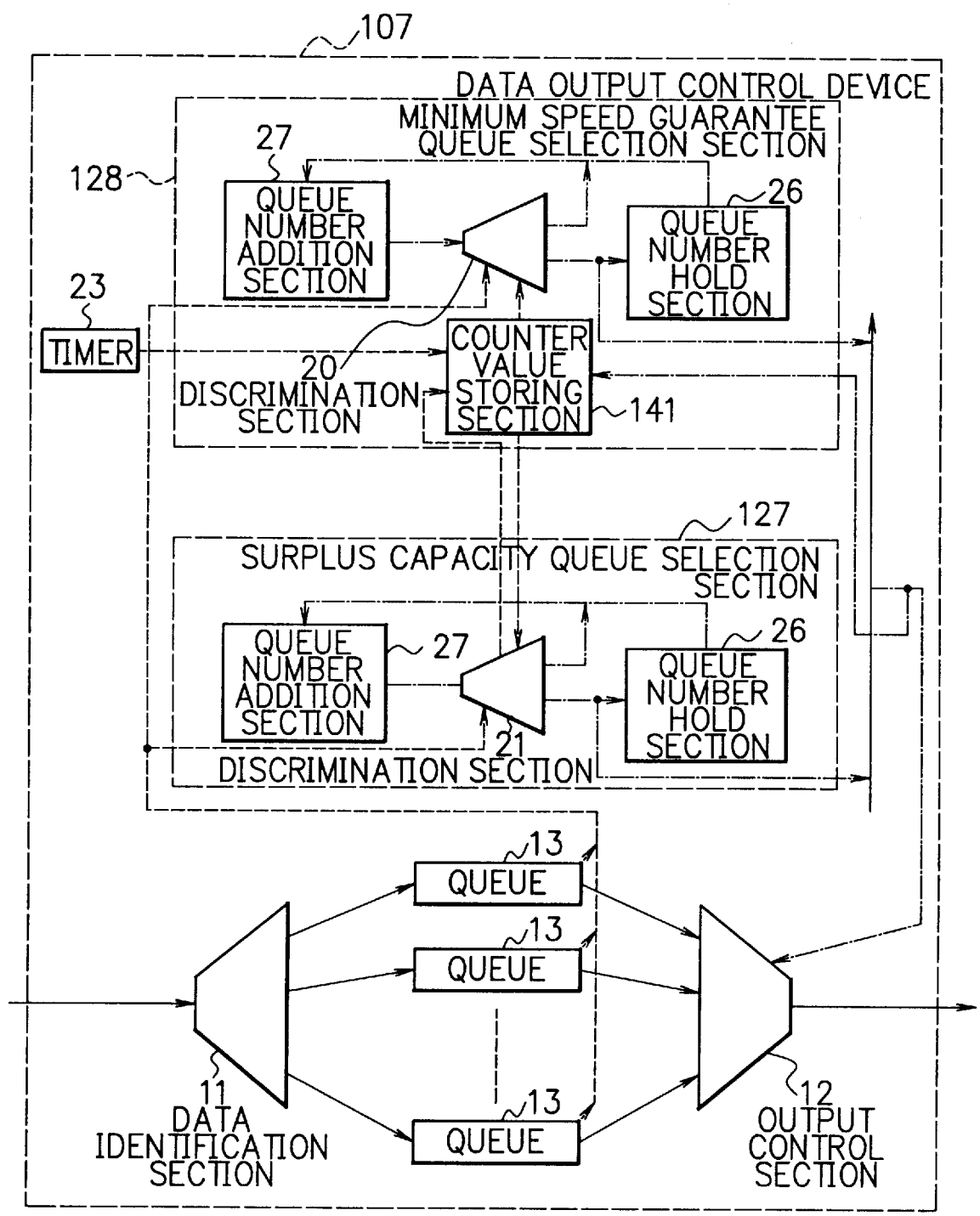
FIG. 17 is a block diagram showing a data output control device according to a sixth embodiment of the present invention.

FIG. 17 is a block diagram showing the present sixth embodiment. As shown in FIG. 17, a data output control device 107 comprises a plurality of queues 13, a data identification section 11 for implementing identification of the arrived data to store within the appropriate queue 13, a minimum data speed guaranteeing queue selection section 128 and a surplus capacity queue selection section 127 for selecting the queue 13, a timer 23, and an output control section 12 for outputting one of the data to the output circuit while taking one of the data from the queue due to the instruction both of the queue selection sections 127 and 128.

Further, the minimum data speed guaranteeing queue selection section 128 comprises a counter value storing section 141 for hold a weight for minimum data guaranteeing, a weight for surplus capacity, a value of the counter, and priority state in every respective queue 13, a queue number hold section 26 for hold the number of the queue which had transmitted the data at the last time, a discrimination section 20, and a queue number addition section 27. Furthermore, the surplus capacity queue selection section 127 comprises a queue number hold section 26 for holding the number of the queue which had transmitted data at the last time, a discrimination section 21, and a queue number addition section 27. A counter value storing section 141 is shared with the minimum data speed guaranteeing queue selection section 128 and the surplus capacity queue selection section 127.

Figure 18:
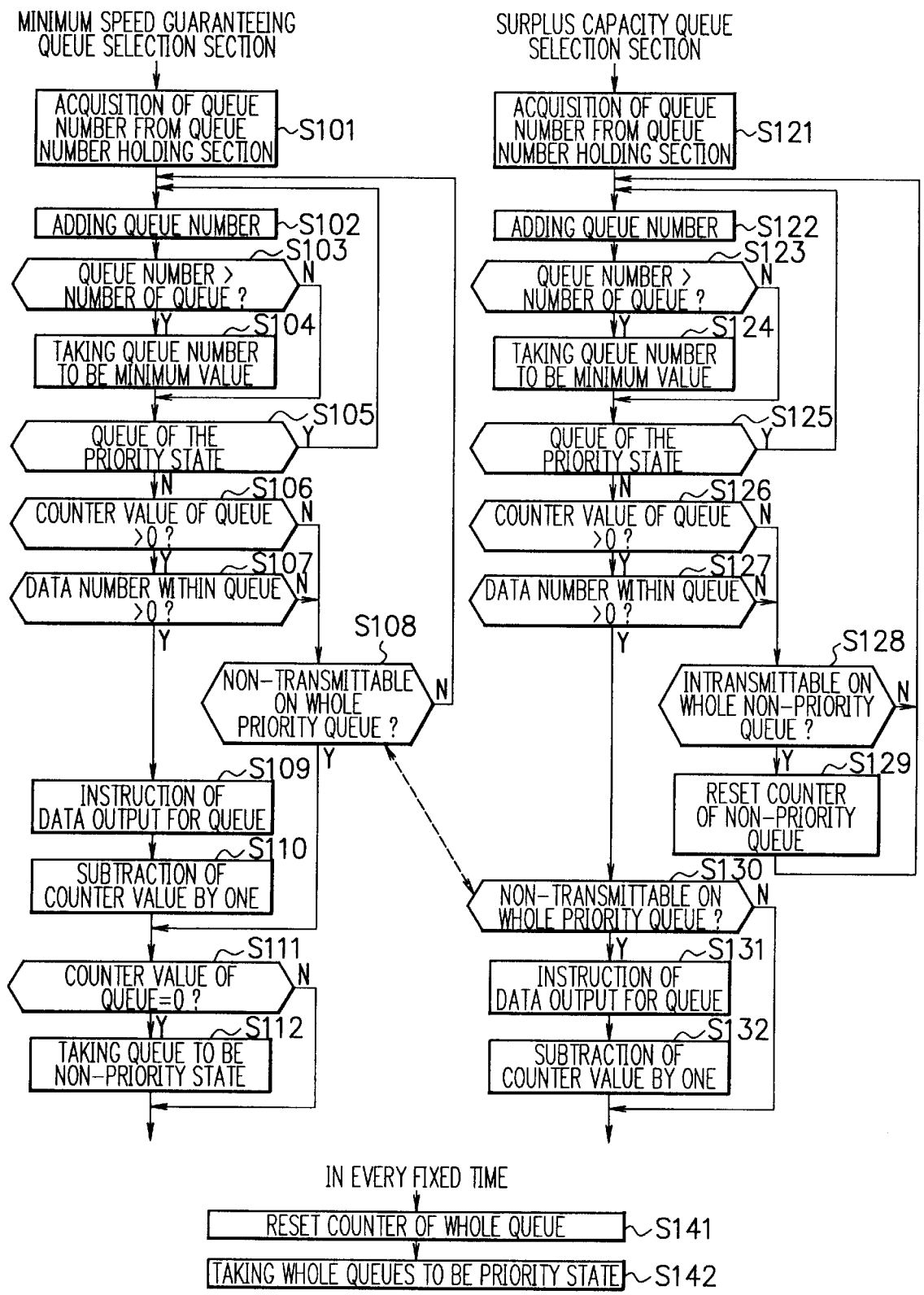
FIG. 18 is a flow chart showing an operation example of the queue selection section in the data output control device according to the sixth embodiment of the present invention.

FIG. 18 is a flow chart showing an operation example both of the minimum data speed guaranteeing queue selection section 128 and the surplus capacity queue selection section 127 in the present sixth embodiment.

Next, operation of the present sixth embodiment will be described referring to FIGS. 17 and 18.

In the initial state, the respective queues 13 are of the priority state, and the counter of the respective queues are the value of the weight for the minimum data speed guaranteeing respectively.

The minimum data speed guaranteeing queue selection section 128 causes the queue which implements data output to be selected cyclically from the queue of the priority state having data and the counter value thereof is more than 1 (one) (S101–S107, S109), while the surplus capacity queue selection section 127 causes the queue which implements data output to be selected cyclically from the queue of the non-priority state having data and the counter value thereof is more than 1 (one) (S121–S127, S131). Normally, the data output is implemented from the queue which is selected by the minimum data speed guaranteeing queue selection section 128, only when the queue is not selected (Y of S108, Y of S130), the data output is implemented from the queue selected at the surplus capacity queue selection section 127.

Further, the minimum data speed guaranteeing queue selection section 128 causes the counter value of the queue which had transmitted data to be subtracted by 1 (one) (S110). The queue whose counter value had become 0 (zero) comes into non-priority state (S111, S112). Furthermore, the minimum data speed guaranteeing queue selection section 128 implements the reset operation. It causes the counter value of the whole queue to be taken as respective values of the weight for minimum data speed guaranteeing in every time intervals due to the timer 23 (S141), and causing the whole queues to be of the priority state (S142).

On the other hand, the surplus capacity queue selection section 127 causes the counter value which had outputted the data to be subtracted by 1 (one) (S132). Further, in every time when the queue to be selected is lost (Y of S128), the surplus capacity queue selection section 127 implements the reset operation that it causes the counter value of the queue which is of the non-priority state to be taken as the value of the weight for the surplus capacity (S129).

Figure 19:
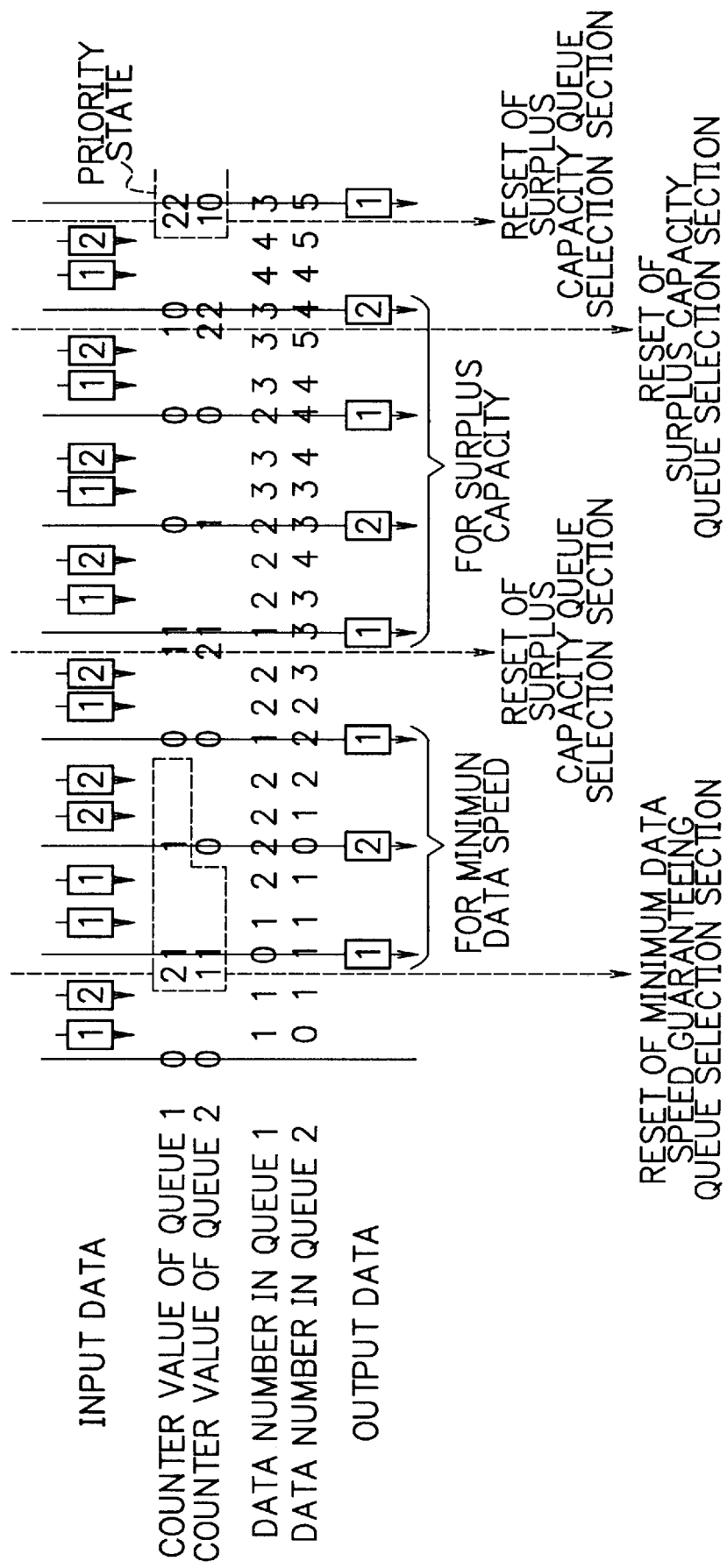
FIG. 19 is a timing chart showing an operation example of the data output control device according to the sixth embodiment of the present invention.

FIG. 19 shows an operation example of the present sixth embodiment. FIG. 19 shows that how to occur the changes the content of respective lists, the counter value of respective queues, and the data number in respective queues just after accompanying the data input, the data output, and the reset operation. In this place, the same establishment as that of FIG. 14 is implemented. According to FIG. 19, it is shown that the queues 1 and 2 output two and one of the data respectively for the minimum data speed guaranty, before transmitting data in the ratio of 1 (one) to 2 (two) until next reset, however, the order of the data is different from that of the fifth embodiment in some degree.

Thus, the present sixth embodiment guarantees the minimum data speed in relation to the respective queues while using both of the minimum data speed guaranteeing queue selection section 128 and the surplus capacity queue selection section 127, and causing the surplus capacity of the output circuit to be allocated to the respective queues with voluntary ratio. With the result that, the present sixth embodiment resolves the fifth problem of the Weighted Round Robin system.

Figure 1:
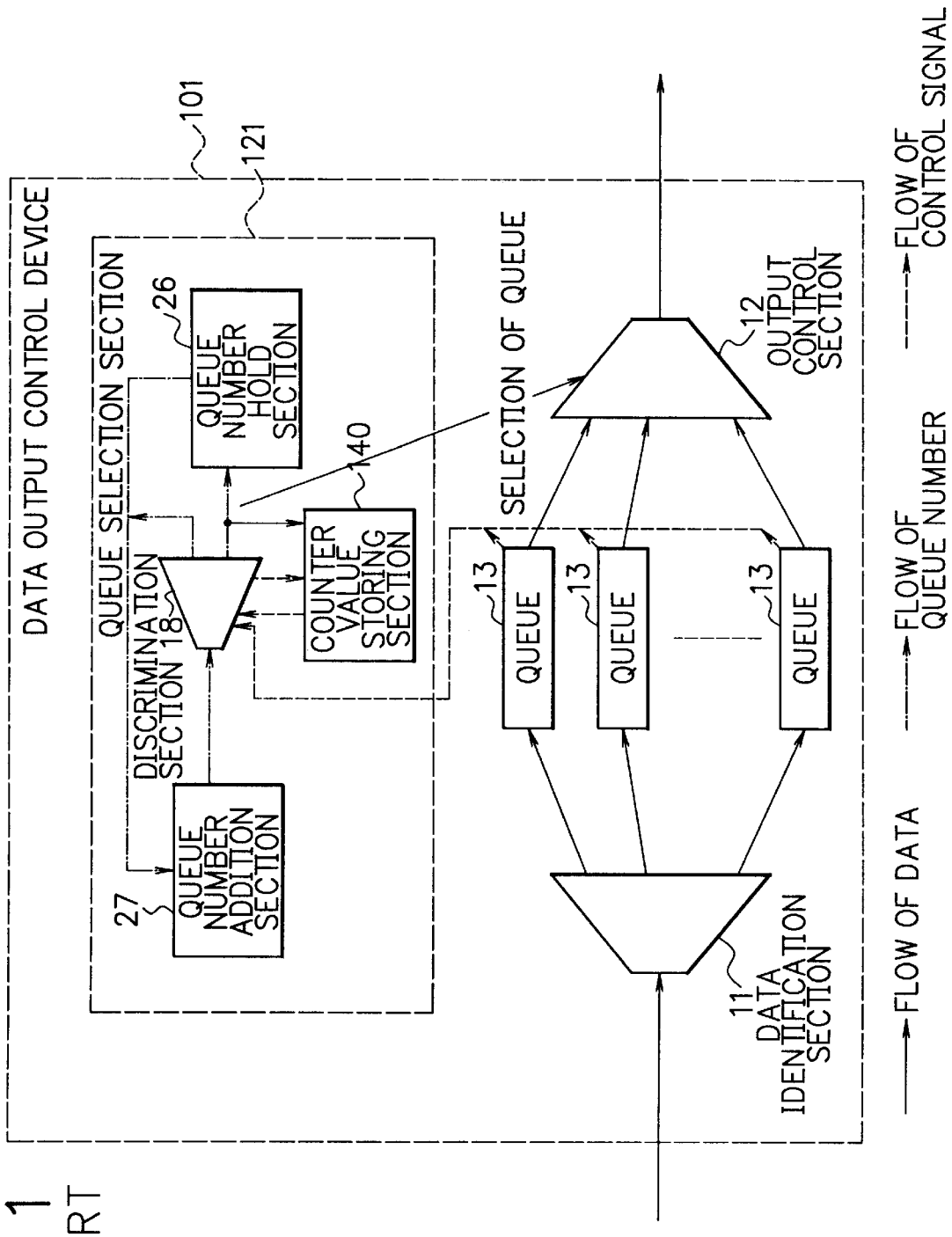
FIG. 1 is a block diagram showing a conventional data output control device to which Weighted Round Robin system is applied.
Figure 2:
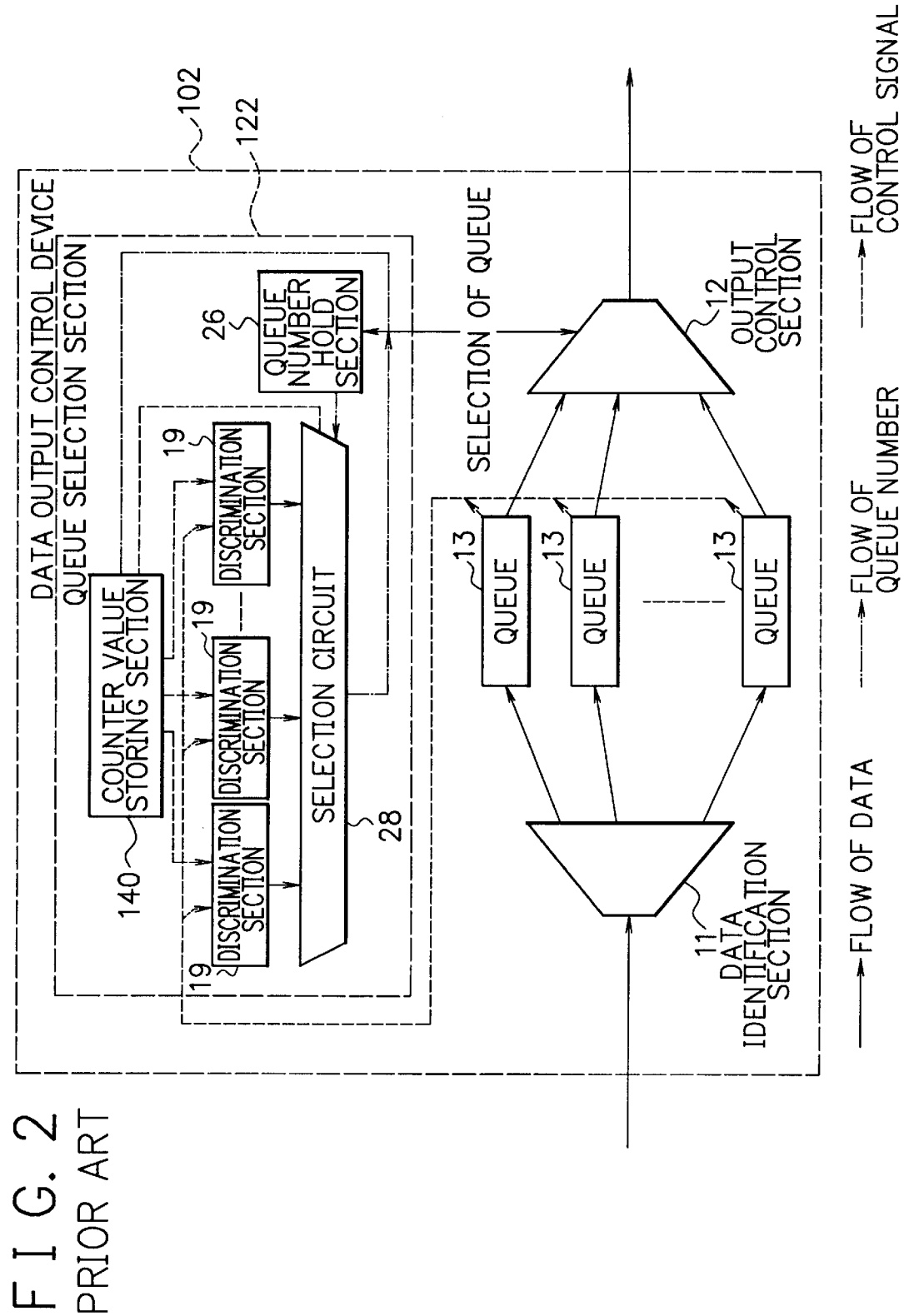
FIG. 2 is a block diagram showing a conventional data output control device to which Weighted Round Robin system is applied.

Moreover, in the present sixth embodiment, the Weighted Round Robin system shown in FIG. 1 is applied by way both of the minimum data speed guaranteeing queue selection section 128 and the surplus capacity queue selection section 127, however, it is capable of adopting a configuration which has the discrimination sections in parallel as shown in FIG. 2.

[SEVENTH EMBODIMENT]

Figure 20:
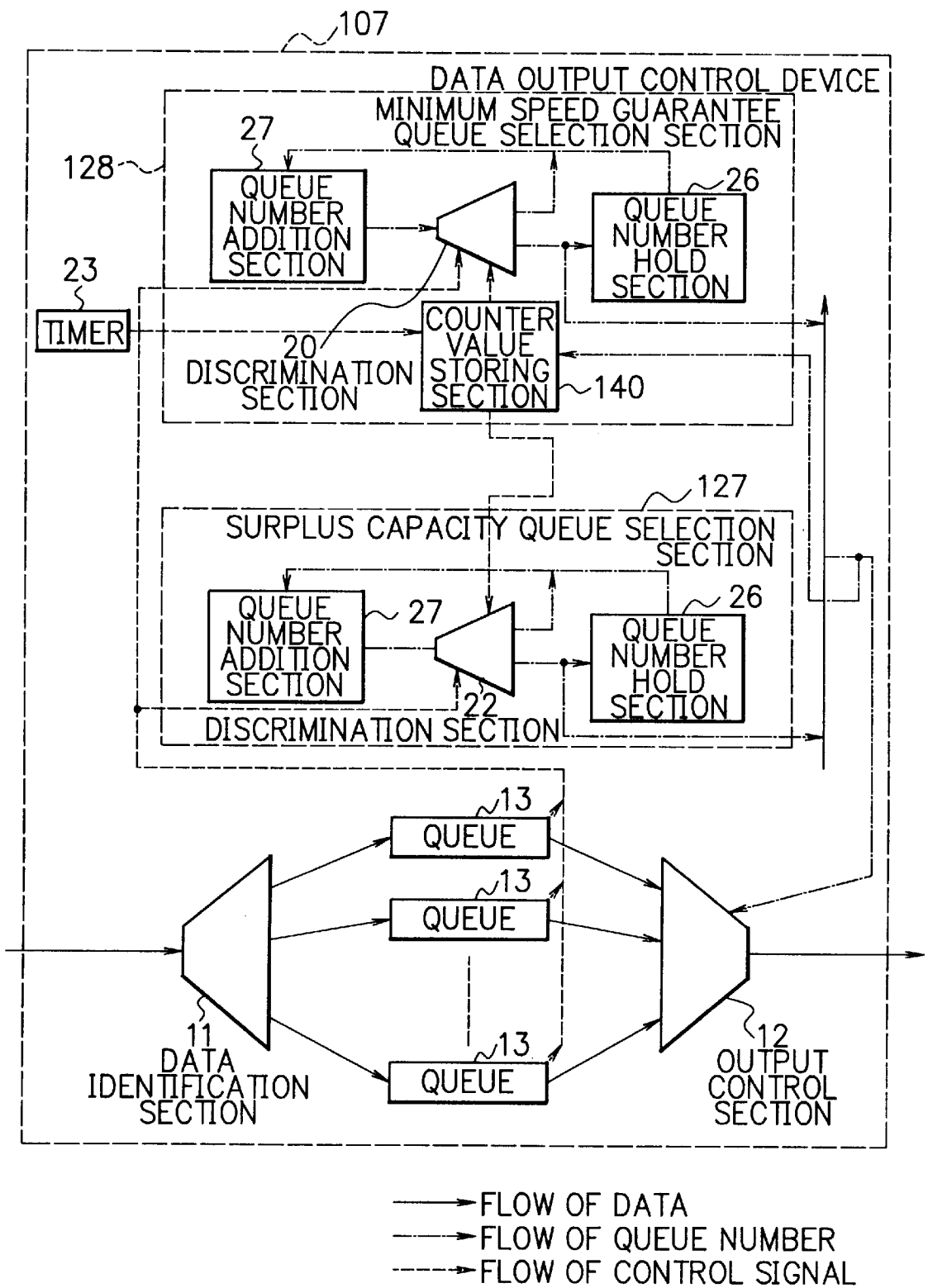
FIG. 20 is a block diagram showing a data output control device according to a seventh embodiment of the present invention.

FIG. 20 is a block diagram showing a present seventh embodiment. As shown in FIG. 20, a data output control device 107 of the present seventh embodiment has approximately the same configuration as the data output control device 107 of the sixth embodiment. However, there does not exist a weight for the surplus capacity in the counter value storing section 140. Consequently, the surplus capacity queue selection section 127 causes the propriety of the data transmission to be judged based on only data number in the queue, thus the reset operation is not implemented. Namely, in the present seventh embodiment, the surplus capacity queue selection section 127 implements a polling operation.

Figure 21:
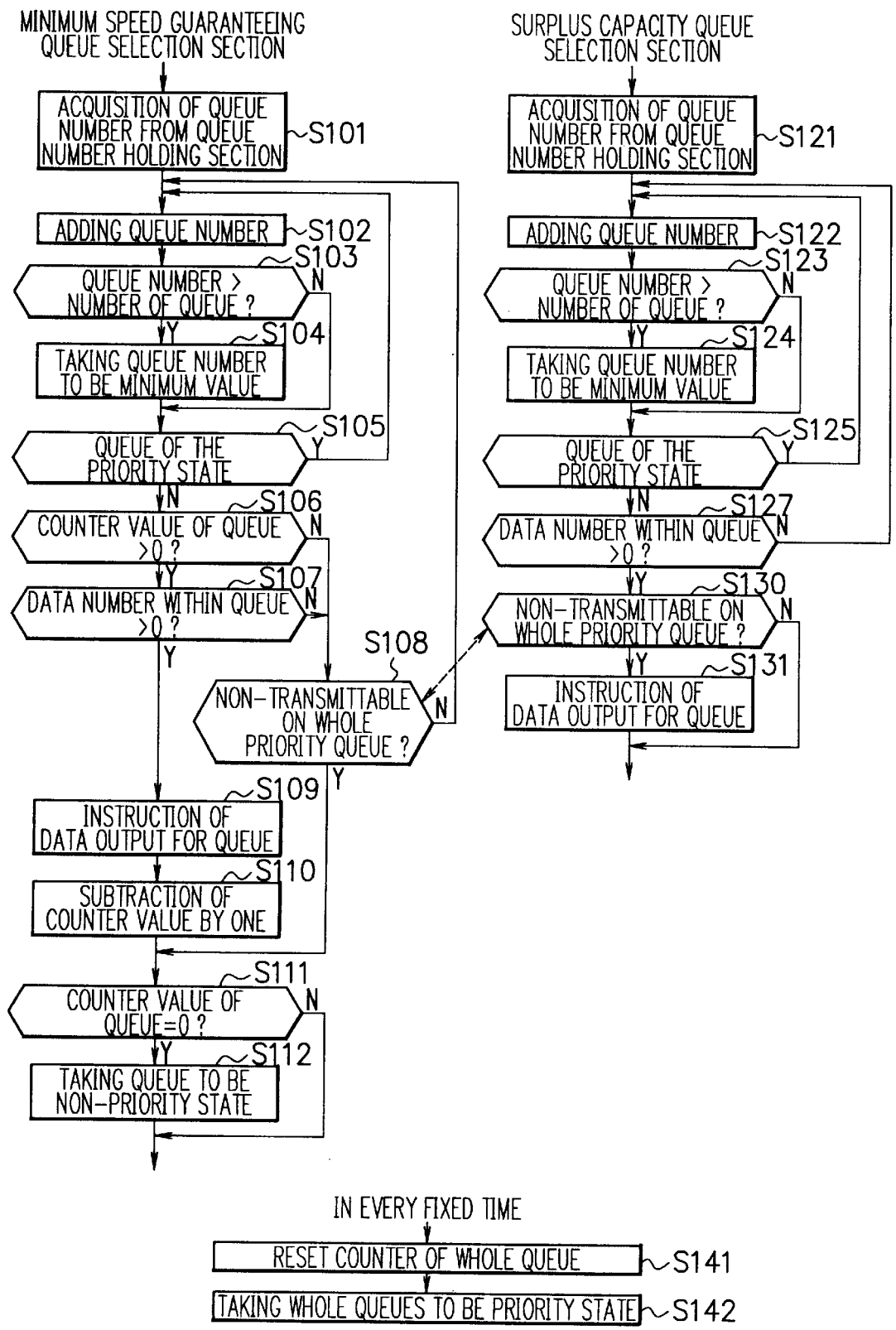
FIG. 21 is a flow chart showing an operation example of the queue selection section in the data output control device according to the seventh embodiment of the present invention.

FIG. 21 is a flow chart showing an operation example both of the minimum data speed guaranteeing queue selection section 128 and the surplus capacity queue selection section 127. There does not exists steps S126, S128, and S129 of FIG. 18.

Next, operation of the present seventh embodiment will be described referring to FIGS. 20 and 21.

In the initial state, the respective queues 13 are of the priority state, and the counter of the respective queues are value of the respective weights for the minimum data speed guaranteeing.

The minimum data speed guaranteeing queue selection section 128 causes the queue executing data output to be selected cyclically from the queue which is of the priority state, having the data, and whose counter value is more than 1 (one) (S101–S107, S109), and the surplus capacity queue selection section 127 causes the queue executing data output to be selected cyclically from the queue which is of the non-priority state, and having the data (S121–S127, S131). Normally, the data output is implemented from the queue which is selected by the minimum data speed guaranteeing queue selection section 128, only when the queue is not selected (Y of S108, Y of S130), the data output is implemented from the queue selected at the surplus capacity queue selection section 127.

Further, the minimum data speed guaranteeing queue selection section 128 causes the counter value of the queue which had transmitted data to be subtracted by 1 (one) (S110). The queue whose counter value had become 0 (zero) comes into non-priority state (S111, S112). Furthermore, the minimum data speed guaranteeing queue selection section 128 implements the reset operation. It causes the counter value of the whole queue to be taken as respective values of the weight for minimum data speed guaranteeing in every time intervals due to the timer 23 (S141), and causing the whole queues to be of the priority state (S142).

Figure 22:
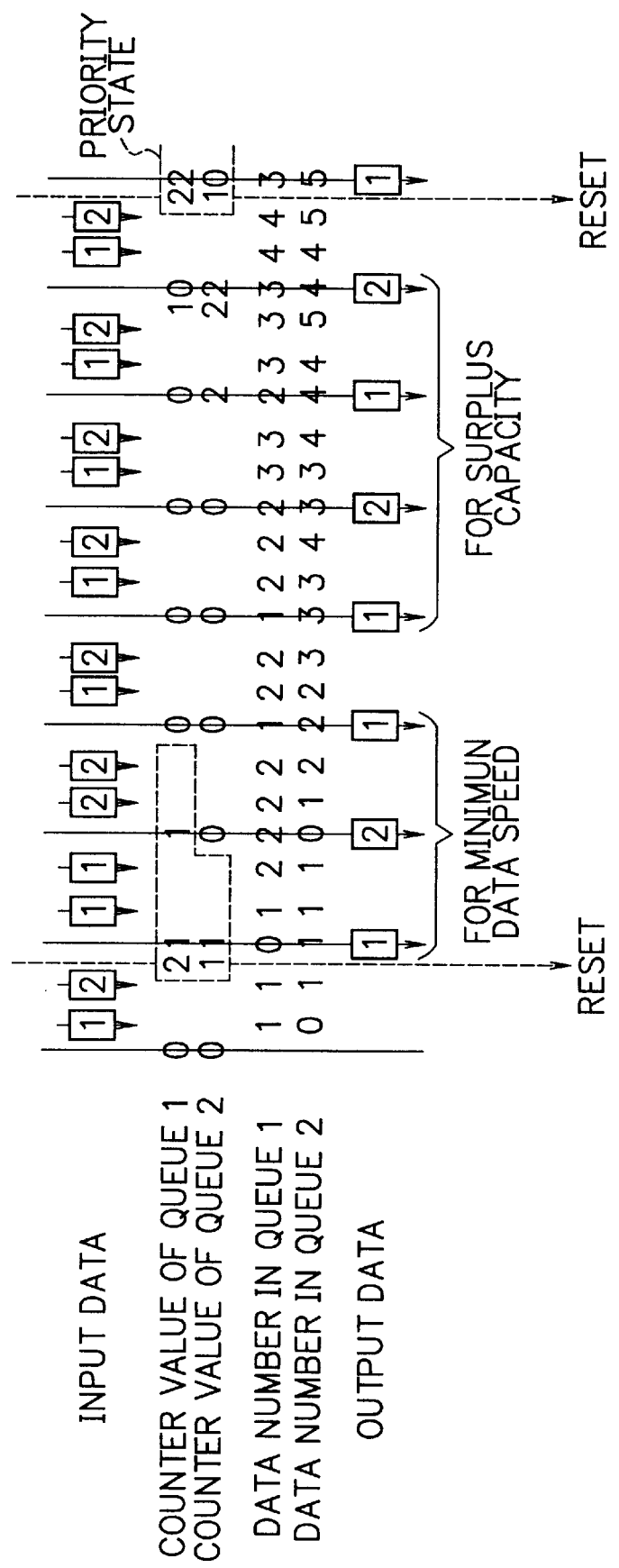
FIG. 22 is a timing chart showing an operation example of the data output control device according to the seventh embodiment of the present invention.

FIG. 22 shows an operation example of the present seventh embodiment. FIG. 22 shows that how to occur the changes the content of respective lists, the counter value of respective queues, and the data number in respective queues just after accompanying the data input, the data output, and the reset operation. In this place, the same establishment as that of FIG. 14 is implemented. According to FIG. 22, it is shown that the queues 1 and 2 output two and one of the data respectively for the minimum data speed guaranty, before transmitting data in the equivalent ratio until next reset.

Thus, the present seventh embodiment guarantees the minimum data speed in relation to the respective queues while using both of the minimum data speed guaranteeing queue selection section 128 and the surplus capacity queue selection section 127, and causing the surplus capacity of the output circuit to be allocated to the respective queues with equivalent ratio. With the result that, the present seventh embodiment resolves the fifth problem of the Weighted Round Robin system.

Moreover, in the present seventh embodiment, the Weighted Round Robin system shown in FIG. 1 is applied by way both of the minimum data speed guaranteeing queue selection section 128 and the surplus capacity queue selection section 127, however, it is capable of adopting a configuration which has the discrimination sections in parallel as shown in FIG. 2.

[EIGHTH EMBODIMENT]

The present eighth embodiment causes the respective queue to be allocated into two priority classes, namely allocating into class 1 and class 2, while enlarging the first embodiment.

Figure 23:
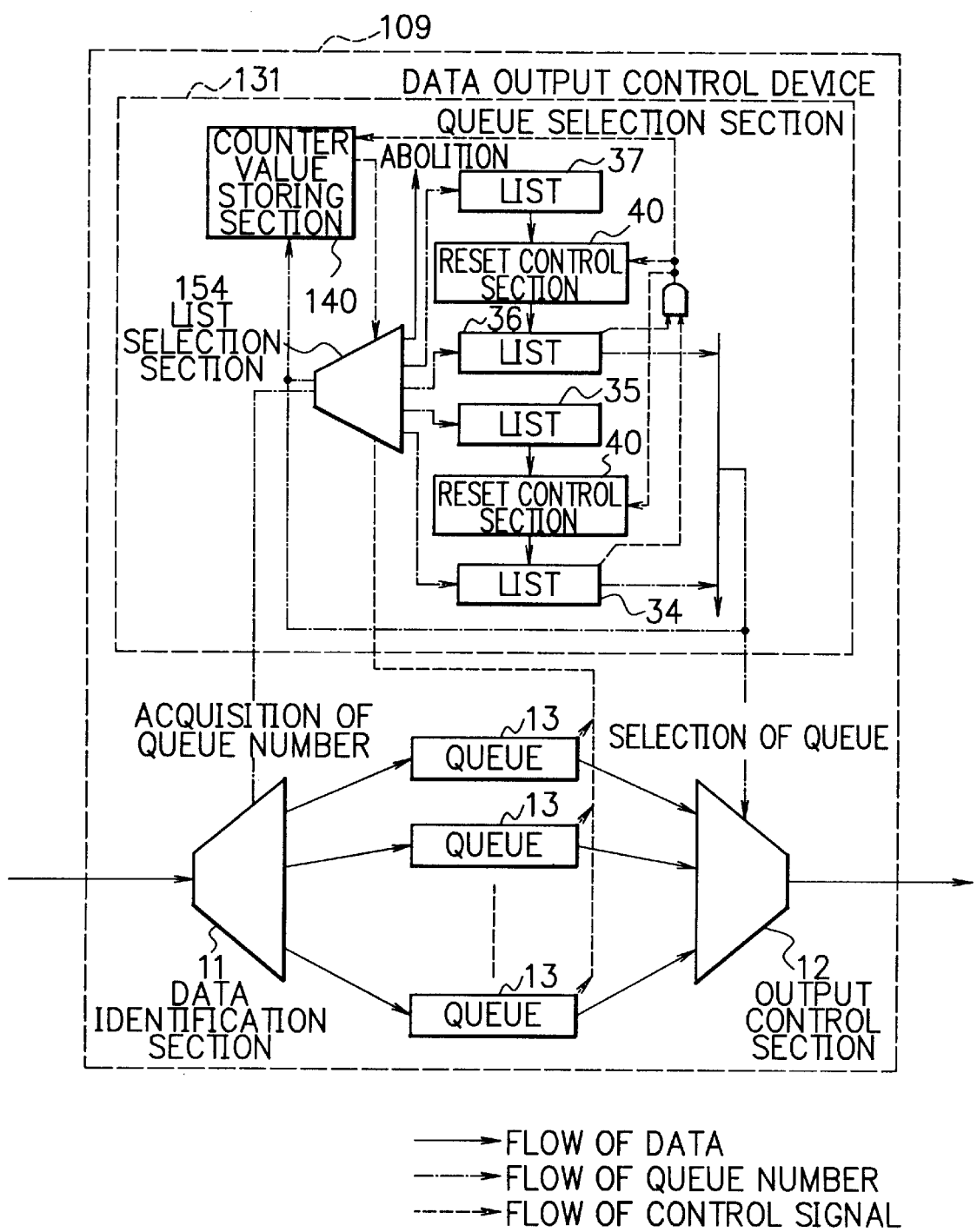
FIG. 23 is a block diagram showing a data output control device according to a eighth embodiment of the present invention.

FIG. 23 is a block diagram showing a present eighth embodiment. As shown in FIG. 23, a data output control device 109 comprises a plurality of queues 13, a data identification section 11 for implementing identification of arrival data to store within an appropriate queue 13, a queue selection section 131 for selecting the queue which should output data, and an output control section 12 for outputting to the output circuit while taking one of the data from the queue 13 based on the instruction of the queue selection section 131.

Further, the queue selection section 131 comprises a counter value storing section 140 for hold a value of a counter and a value of a weight in every queue 13; a transmittable queue number list 34 for the sake of class 1 and for holding the number of the queue which has data more than one, and whose value of the counter is more than 1 (one); an non-transmittable queue number list 35 for the sake of class 1 and for holding the number of the queue which has data more than one, and whose value of the counter is 0 (zero); a transmittable queue number list 36 for the sake of class 2 and for holding number of the queue which has the data more than one, and whose value of the counter is more than 1 (one); an non-transmittable queue number list 37 for the sake of class 2 and for holding the number of the queue which has the data more than one, and whose value of the counter is 0 (zero); a list selection section 154 for receiving the number of the queue 13 within which the input data is stored from the data identification section 11, before either storing the number within an appropriate list or discarding the number; and reset control sections 40 in every respective classes for implementing a reset operation of the list.

FIG. 24 is a flow chart showing an operation example of the queue selection section 131 in the present eighth embodiment.

Next, operation of the present eighth embodiment will be described referring to FIGS. 23 and 24.

In the initial state, the whole lists 34 to 37 are empty, and the counters of the respective queues 13 are set to the respective values of the weights.

When the input data arrives at the data output control device 109, the data is stored within the appropriate queue 13 by the data identification section 11, simultaneously the queue number is transmitted to the queue selection section 131.

When the list selection section 154 in the queue selection section 131 acquires the queue number (S151), if the queue 13 of the queue number possesses data with the exception of the present input data (N of S152), discarding the queue number being transmitted (S153), while if the queue 13 of the queue number possesses data which is identical with the present input data (Y of S152), by searching the counter value of the queue (S154), when the value of counter is more than 1 (one) (Y of S154), the list selection section 154 causes the number of the queue 13 to be stored within the rearmost of either the transmittable queue number list 34 or 36 which is of the priority order class to which the queue belongs (S155), while when the value of counter is 0 (zero) (N of S154), the list selection section 154 causes the number of the queue 13 to be stored within the rearmost of either the non-transmittable queue number list 35 or 37 which is of the priority class to which the queue belongs (S156).

Next, the queue selection section 131 fetches the queue number from the forefront of the transmittable queue number list (34 or 36) which is the highest class of the priority level in the transmittable queue number list having data (S164, S165, S166). When the transmittable queue number list 34, 36 of the whole class are empty (Y of S161), the reset operation is implemented in such a way that the reset control section 40 causes the counter of whole queue 13 in the counter value storing section 140 to be returned to the value of respective weights (S162), and causes the whole content of the non-transmittable queue number list 35, 37 to shift to the transmittable queue number list 34, 36 (S163), before taking the queue number from the forefront of the transmittable queue number list (34 or 36) which is the highest class of the priority level in the transmittable queue number list having data (S164, S165, S166). The queue number being taken is transmitted to the output control section 12 in conjunction with an instruction of the data output (S167).

The output control section 12 outputs to the output circuit while taking one of the data from the queue 13 corresponding to the above-described queue number being taken.

The list selection section 154 causes the value of the counter of the queue 13 to be subtracted by one (S168), if data number in the queue 13 after data outputting is 0 (zero) (N of S169), causing the queue number of the queue 13 to be discarded (S170), while if data number in the queue 13 after data outputting is not 0 (zero) (Y of S169), by searching the counter value of the queue 13 (S171), when the value is more than 1 (one) (Y of S171), thus storing the number of the queue 13 within the rearmost of the transmittable queue number list 34 or 36 of the priority class to which the queue belongs (S172), when the value is 0 (zero) (N of S171), thus storing the number of the queue 13 within the rearmost of the non-transmittable queue number list 35 or 37 of the priority class to which the queue belongs (S173).

Figure 25:
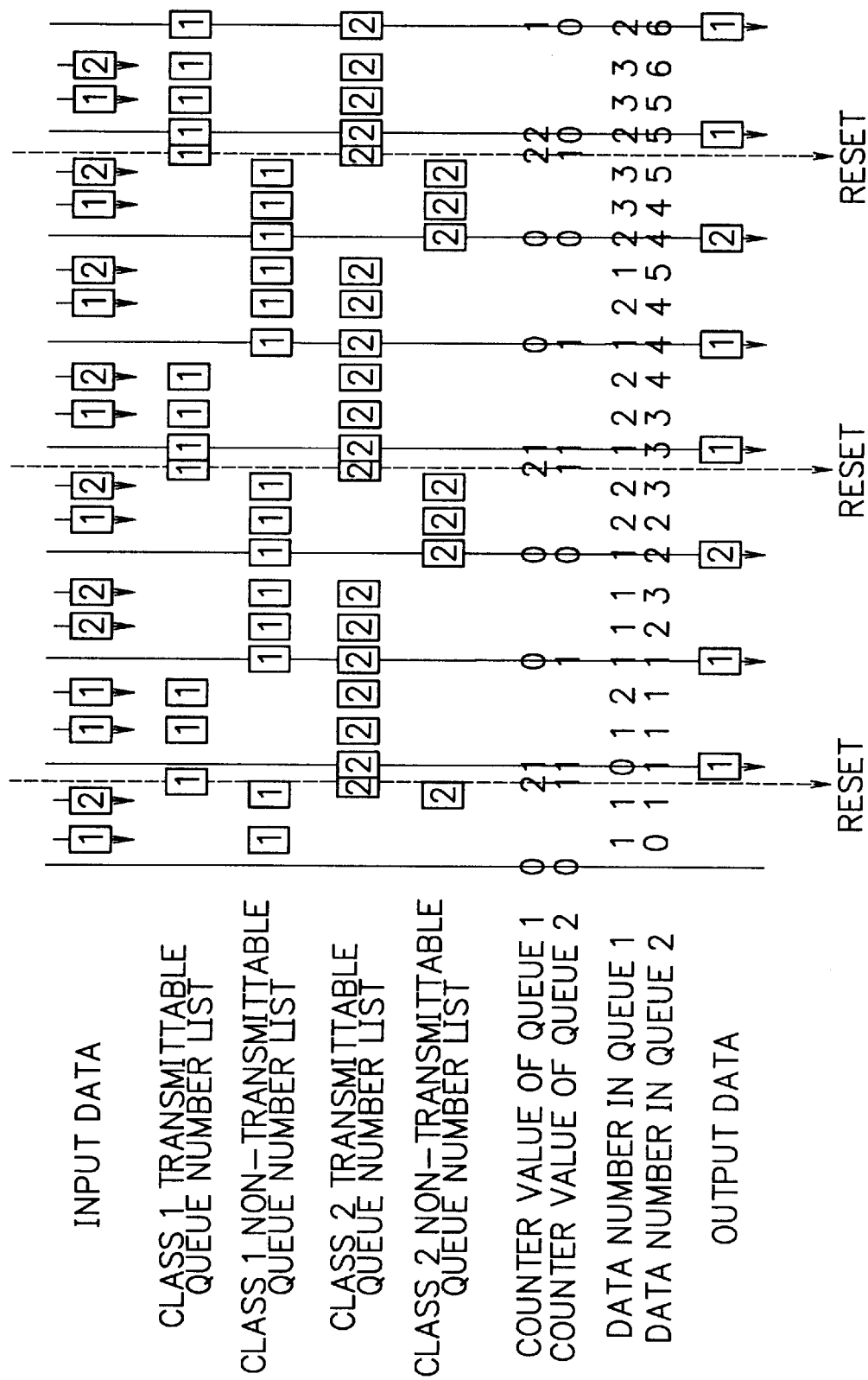
FIG. 25 is a timing chart showing an operation example of the data output control device according to the eighth embodiment of the present invention.

FIG. 25 is an operation example of the present eighth embodiment. FIG. 25 shows that how to occur the changes in terms of the content of respective lists, the counter value of respective queues, and the data number in respective queues just after the accompanied data input, data output, and reset operation. In this place, the number of the queue is set to 2 (two), the weight of the queue 1 is set to 2 (two), the weight of the queue 2 is set to 1 (one). There is provided two classes with respect to the priority class in that the queue 1 is taken as class 1, and the queue 2 is taken as class 2. From FIG. 25, it is shown that the data is outputted from both of the queue 1 and the queue 2 in the ratio of 2 (two) to 1 (one). When the both are capable of outputting data, it is shown that data is outputted from the queue 1 in preference to the queue 2.

Thus the present eighth embodiment possesses both the transmittable queue number list and the non-transmittable queue number list in every respective priority classes 1 and 2, and causing the queue belonging to the class 1 to be selected in preference to the class 2 at the time of data transmission, thus transmitting data of the class 1 in preference to the class 2 while guaranteeing the minimum data speed in relation to the whole queues. As a result thereof, the present eighth embodiment resolves the fourth problem of the Weighted Round Robin system. Also the present eighth embodiment resolves the first and the second problems of the Weighted Round Robin system by virtue of the same operation as the first embodiment.

Furthermore, in the present eighth embodiment, there is provided two classes of the priority class, however, it is capable of providing the priority class more than three classes.

[NINTH EMBODIMENT]

The present ninth embodiment causes the respective queue to be divided into two priority classes, namely dividing into class 1 and class 2, while enlarging the second embodiment.

A configuration of the present ninth embodiment causes the transmittable priority queue number list and the transmittable non-priority queue number list to be provided in every respective priority classes in the configuration of the second embodiment. Operation of the present ninth embodiment is approximately the same as that of the second embodiment. The different points are as follows: In case of storage of the queue number within the list, it causes the queue number to be stored separately by the priority class to which the queue belongs. In case of the transmission of the data, it causes the queue number to be taken from the list of the highest priority level of the transmittable priority queue number lists having the data, if the whole transmittable priority queue number lists are empty, it causes the queue number list to be taken from the list of the highest priority level of the transmittable non-priority queue number list having the data. In case of the reset operation, it causes the queue number in the respective transmittable non-priority queue number lists to be shifted to the transmittable queue number list of the same priority class.

The present ninth embodiment causes the respective lists to be possessed by two in every priority class, and causing the data of the queue of class of the high priority level to be transmitted by selecting the queue belonging to the class 1 in case of transmission in preference to the other, thus guaranteeing the minimum data speed. The surplus capacity of the output circuit is divided equally by the queue in the class of the highest priority level, subsequently, only when the priority class of a higher rank causes the capacity of the output circuit to be in excess, next class of the priority level of a higher rank divides equally the surplus capacity by the queue in the class, so that it causes the fourth and the fifth problems of the Weighted Round Robin system to be resolved. Further, the first and the second problems of the Weighted Round Robin system are resolved.

Furthermore, in the present ninth embodiment, the priority class is taken to be two classes, however, it is capable of providing the priority class more than three classes.

[TENTH EMBODIMENT]

The present tenth embodiment causes the respective queues to be divided into two priority classes, namely into the class 1 and the class 2 while enlarging the fifth embodiment.

A configuration of the present tenth embodiment is that it causes the respective lists to be possessed in every priority class in the configuration of the fifth embodiment. Operation of the present tenth embodiment is approximately the same as the operation of the fifth embodiment. The different points are as follows: In case of storage of the queue number within the list, it causes the queue number to be stored separately by the priority class to which the queue belongs. In case of the transmission of the data, it causes the queue number to be taken from the list of the highest priority level of the transmittable priority queue number lists having the data, if the whole transmittable priority queue number lists are empty, it causes the queue number list to be taken from the list of the highest priority level of the transmittable non-priority queue number list having the data. The reset operation in terms of the non-priority queue is implemented when the non-priority queue of the whole priority class are empty. In case of both of the reset operation in terms of the whole queues and the reset operation in terms of the non-priority queue, it causes movement of the queue number in the list to be implemented within the same priority class.

The present tenth embodiment causes the respective lists to be possessed by two in every priority class, and causing the data of the queue of class of the high priority level to be transmitted by selecting the queue belonging to the class 1 in case of transmission in preference to the other, thus guaranteeing the minimum data speed in relation to the whole queues. The tenth embodiment causes the surplus capacity of the output circuit to be divided in between the whole queues with the voluntary ratio. Further, although the tenth embodiment causes the data of the queue of the high priority class to be transmitted in preference to the other, the data transmitted for the sake of the minimum guaranty is prior than the data transmitted for the sake of surplus capacity to be transmitted without reference to the priority class, thus resolving the first, the second, and the fourth and the fifth problems of the Weighted Round Robin system.

Furthermore, in the present tenth embodiment, the priority class is taken to be two classes, however, it is capable of providing the priority class more than three classes.

[ELEVENTH EMBODIMENT]

The present eleventh embodiment is a modified example of the tenth embodiment. On an equality with the tenth embodiment, the eleventh embodiment causes the minimum data speed to be guaranteed in relation to the whole queues. The eleventh embodiment causes the surplus capacity of the output circuit to be allocated in between the whole queues with the voluntary ratio. Although the data transmitted for the sake of the minimum guaranty is prior than the data transmitted for the sake of surplus capacity to be transmitted, the eleventh embodiment causes the data of the high priority class to be transmitted already in preference to the other without reference thereto, thus resolving the first, the second, and the fourth and the fifth problems of the Weighted Round Robin system.

A configuration of the present eleventh embodiment is the same as the configuration of the tenth embodiment. The different point in between the present eleventh embodiment and the tenth embodiment is that in case of the data transmission, it causes the highest class of the priority level to be selected in the class of the priority level in which either of the transmittable priority queue number list and the transmittable non-priority queue number list has the data, thus taken the queue number from the transmittable priority queue number list with this priority class or the transmittable non-priority queue number list with this priority class.

Further, on an equality with the tenth embodiment, it is capable of providing the priority class more than three classes.

[TWELFTH EMBODIMENT]

Figure 26:
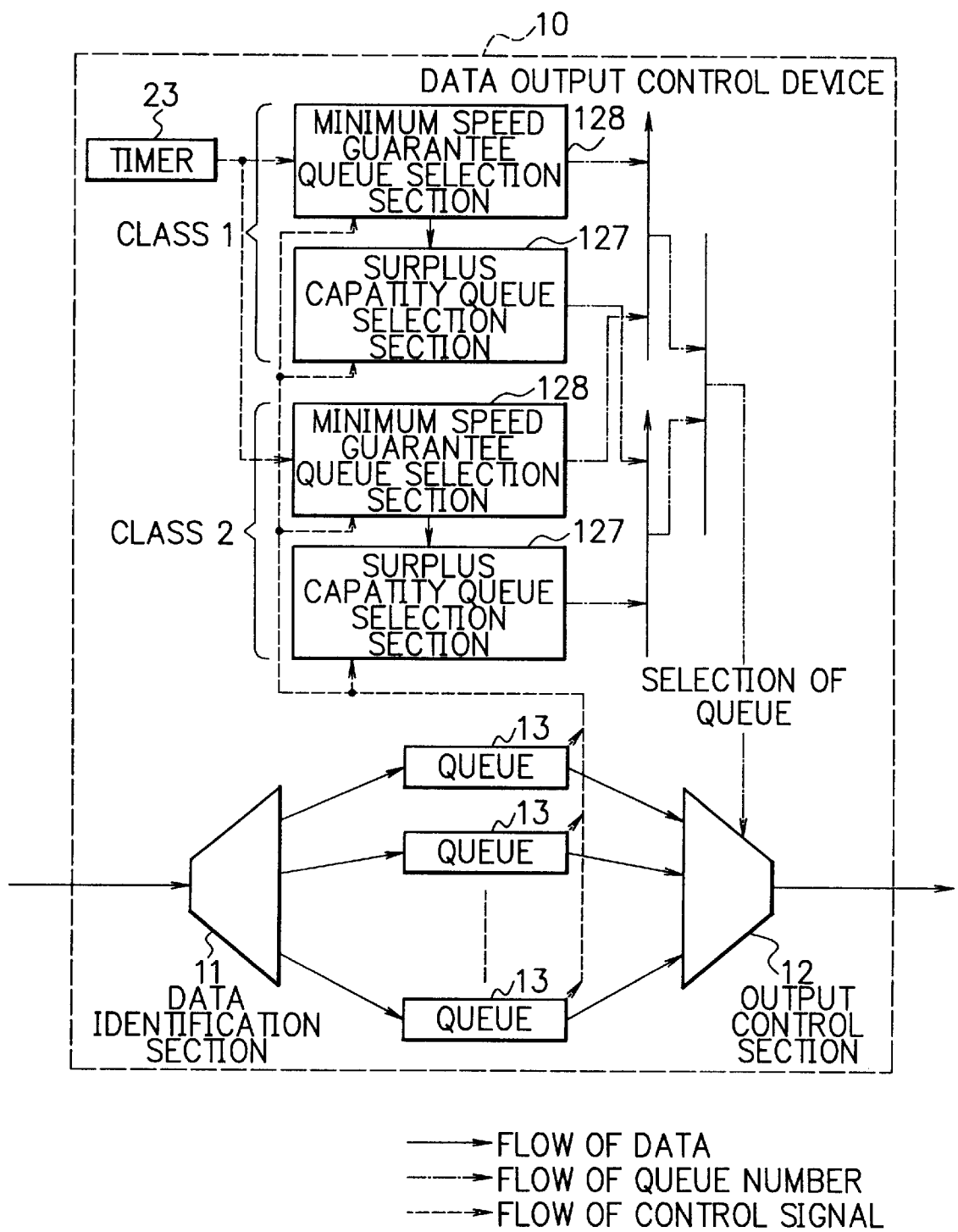
FIG. 26 is a block diagram showing a data output control device according to a twelfth embodiment of the present invention.

FIG. 26 is a block diagram showing a present twelfth embodiment. The present twelfth embodiment causes the respective queues to be divided into two priority classes, namely into the class 1 and the class 2 while enlarging the sixth embodiment or the seventh embodiment. With respect to the configuration of the present twelfth embodiment, in the sixth embodiment or the seventh embodiment, there is provided with the minimum data speed guaranteeing queue selection section 128, and the surplus capacity queue selection section 127 in every class, in case of selection of the queue which transmits the data, although it causes the queue selection section of the high priority class to be taken priority, the minimum data speed guaranteeing queue selection section 128 takes always priority over the surplus capacity queue selection section 127 without reference to the class. The present twelfth embodiment has the same effect as that of the tenth embodiment with the exception that the order of data transmitted is different therefrom in some degree.

Further, the present twelfth embodiment causes the priority class to be taken to be two classes, however, it is capable of providing the priority class more than three classes.

[THIRTEENTH EMBODIMENT]

The present thirteenth embodiment causes the respective queues to be divided into two priority classes, namely into the class 1 and the class 2 while enlarging either the sixth embodiment or the seventh embodiment. A configuration of the thirteenth embodiment is the same as the configuration of the twelfth embodiment, however in case of selection of the queue which transmits the data, although the minimum data speed guaranteeing queue selection section takes priority over the surplus capacity queue selection section, it causes the queue selection section of the high priority class to be taken priority without reference thereto. The present thirteenth embodiment has the same effect as that of the eleventh embodiment with the exception that the order of data transmitted is different therefrom in some degree.

Furthermore, it is also capable of providing the priority class more than three classes.

In the above-mentioned respective embodiments, the reset operation in terms of the respective queues is implemented simultaneously when the reset operation is instructed, however, if the reset operation is implemented in the respective queues individually, or if the reset operation in terms of a queue is implemented when the data arrives at the queue in the first place after the reset operation is instructed, the processing amount of processing which is required to implement at the time of the reset operation simultaneously is reduced, thus the third problem of the Weighted Round Robin system is resolved. Hereinafter, there will be explained embodiments in connection with a distributed reset operation.

[FOURTEENTH EMBODIMENT]

Figure 27:
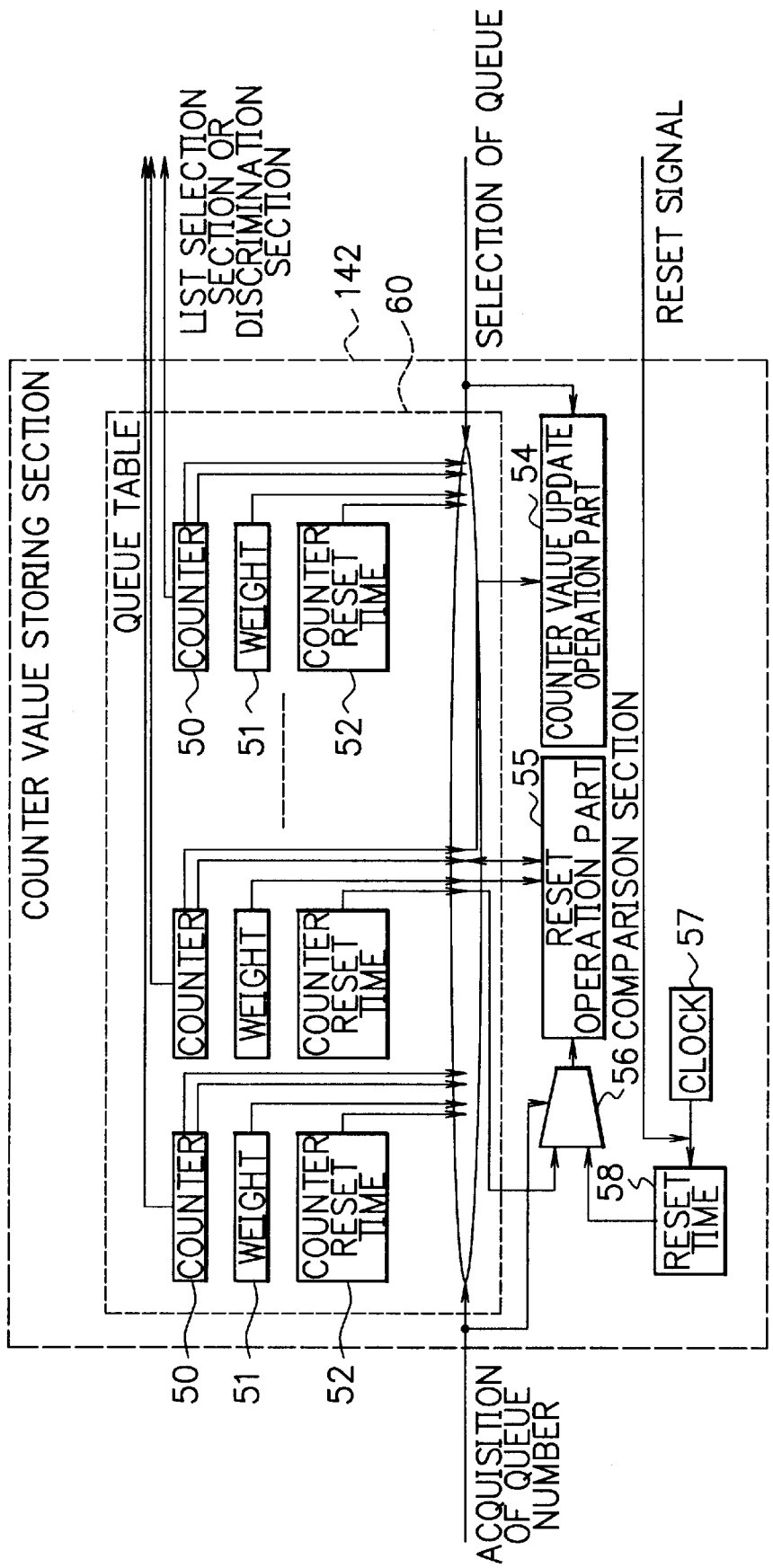
FIG. 27 is a block diagram showing a counter value storing section in the data output control device according to a fourteenth embodiment of the present invention.

FIG. 27 is a block diagram showing a counter value storing section in the present fourteenth embodiment. As shown in FIG. 27, a counter value storing section 142 comprises, in every respective queues, a counter 50, a weight 51, a queue table 60 having a counter reset time 52 for holding the time when reset of the counter is implemented lastly, a clock 57 for clocking current time, a reset time 58 for storing a time when a reset is instructed lastly, a counter value update operation part 54, and a comparison section 56 for instructing a reset operation of the counter in relation to a reset operation part 55 in answer to comparison result in between the counter reset time 52 and the reset time 58.

The counter value storing section 142 of the present fourteenth embodiment is applicable to the counter value storing section in the first to the seventh embodiments described above with the exception of the data output control device of the conventional Weighted Round Robin system. Hereinafter, there will be described the operation of the queue selection section that when it causes the counter value storing section 142 of the present fourteenth embodiment to be adopted in the first embodiment, namely, the counter value storing section 140 of FIG. 3 is taken to be the counter value storing section 142 of the present fourteenth embodiment.

Figure 28:
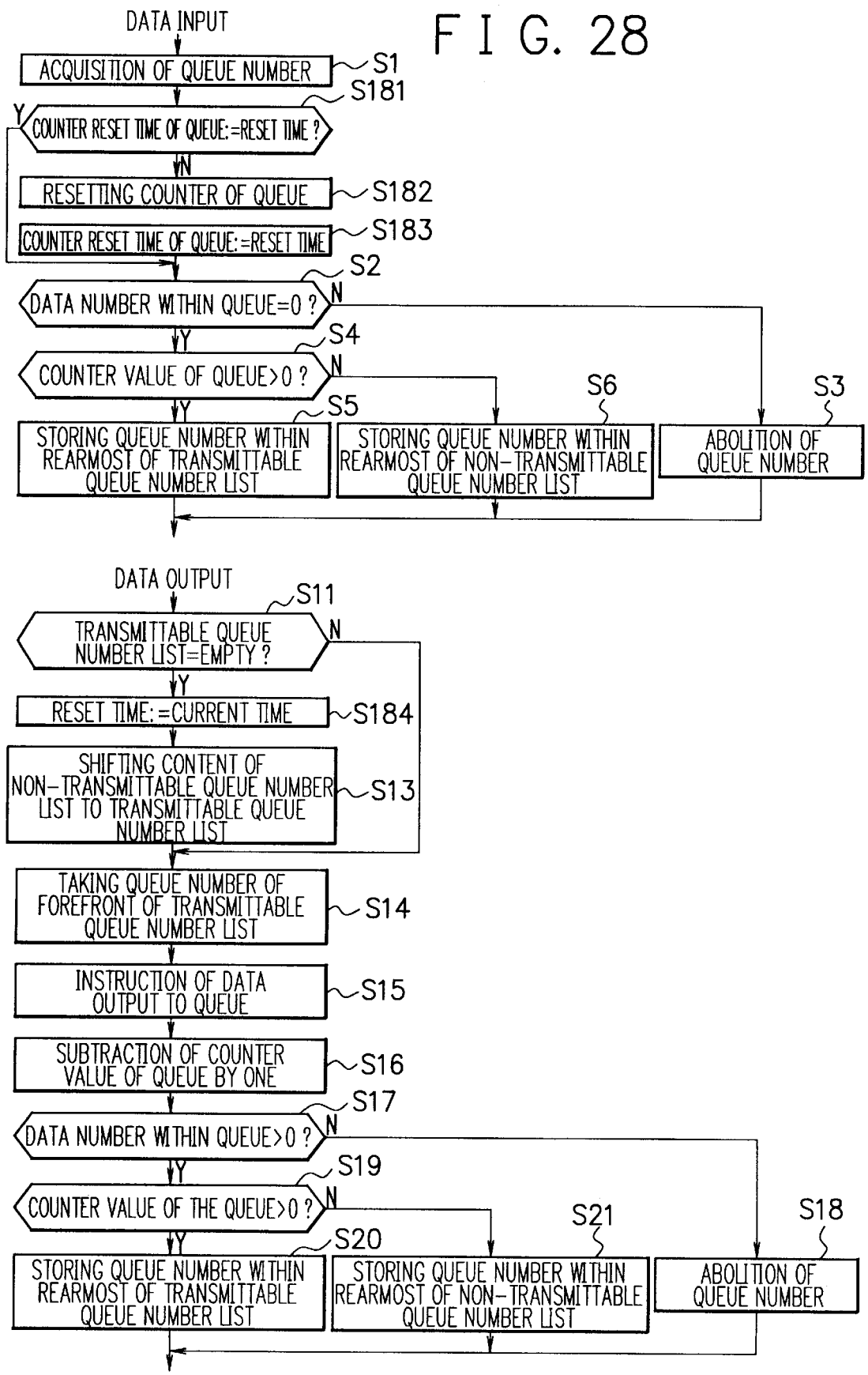
FIG. 28 is a flow chart showing an operation example of the queue selection section in the data output control device according to the fourteenth embodiment of the present invention.

FIG. 28 is a flow chart showing an operation example of the queue selection section 120 when the counter value storing section 142 of the present fourteenth embodiment is adopted at the first embodiment. There are differences in between FIG. 28 and FIG. 5 in that there exists steps S181–S184 in FIG. 28. Operation will be described referring to FIGS. 27, 28, and 3.

At the time of data output, the reset control section 40 of the queue selection section 120, when the transmittable queue number list 30 is empty (Y of S11), instructs a reset operation by transmitting the reset signal to the counter value storing section 142 which, at this time, causes the reset time 58 to be updated to the current time when the clock 57 increments (S184). The counter 50 corresponding to the respective queues 13 is not subjected to the reset at this time.

When the data is inputted to the data output control device 100, the number of the queue 13 within which the data is stored from the data identification section 11 is transmitted to the counter value storing section 142 through the list selection section 150. The comparison section 56 of the counter value storing section 142 compares the counter reset time 52 corresponding to the queue of the transmitted queue number with the reset time 58 (S181), if the counter reset time 52 is different from the reset time 58 (N of S181), the reset operation part 55 causes the counter 50 of the queue to be reset to the weight 51 of the queue (S182) At this time, the content of the counter reset time 52 is updated so as to come to be equal to the reset time 58 (S183). Further, in case of the outputting of the data from the respective queue, the counter value update operation part 54 causes the value of the counter 50 corresponding thereto is subtracted by one.

[FIFTEENTH EMBODIMENT]

Figure 29:
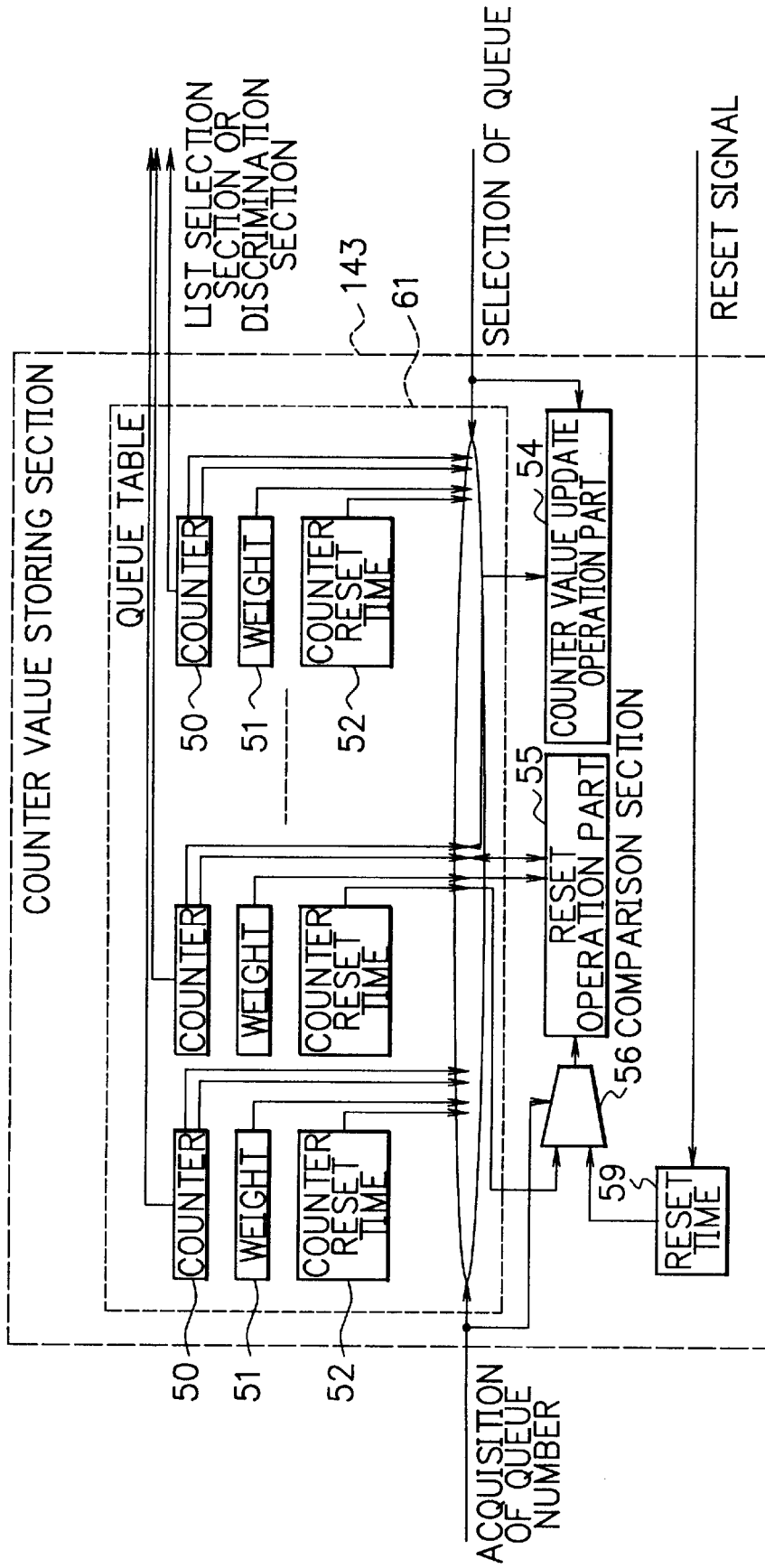
FIG. 29 is a block diagram showing a counter value storing section in the data output control device according to a fifteenth embodiment of the present invention.

FIG. 29 is a block diagram showing the counter value storing section in the present fifteenth embodiment. The counter value storing section 143 of the embodiment enables operation similar to the fourteenth embodiment to be performed while using the reset number of times instead of the times. The counter value storing section 143 of the present fifteenth embodiment comprises, in every respective queues, a counter 50, a weight 51, a queue table 61 having a counter reset counter 53 for hold the number of times of reset of the counter which is implemented until now, a reset counter 59 for showing the number of times of instruction of the reset operation until now, a counter value update operation part 54, a counter reset counter 52, and a comparison section 56 for instructing a reset operation of the counter in relation to the reset operation part 55 in answer to the comparison result in between the counter reset counter 52 and the reset counter 59.

Next, operation of the counter value storing section 143 will be described referring to FIG. 29. When the reset operation is instructed by the reset signal from the outer section, the counter value storing section 143 causes the value of the reset counter 59 to be increased by one. Subsequently, when the data is inputted to the data output control device and the number of the queue within which the data is stored is transmitted, the comparison section 56 of the counter value storing section 143 compares the counter reset counter 52 corresponding to the queue of the transmitted queue number with the reset counter 59, if the counter reset counter 52 is different from the reset counter 59, the reset operation part 55 causes the counter 50 of the queue to be reset to the weight 51 of the queue. At this time, the content of the counter reset counter 52 is updated so as to agree with the reset counter 59. Further, in case of outputting of the data from the respective queues, the counter value update operation part 54 causes the value of the counter 50 corresponding thereto to be subtracted by one.

The counter value storing section 143 of the present fifteenth embodiment is applicable to the counter value storing section in the first to the seventh embodiments described above with the exception of the data output control device of the conventional Weighted Round Robin system.

[SIXTEENTH EMBODIMENT]

Figure 30:
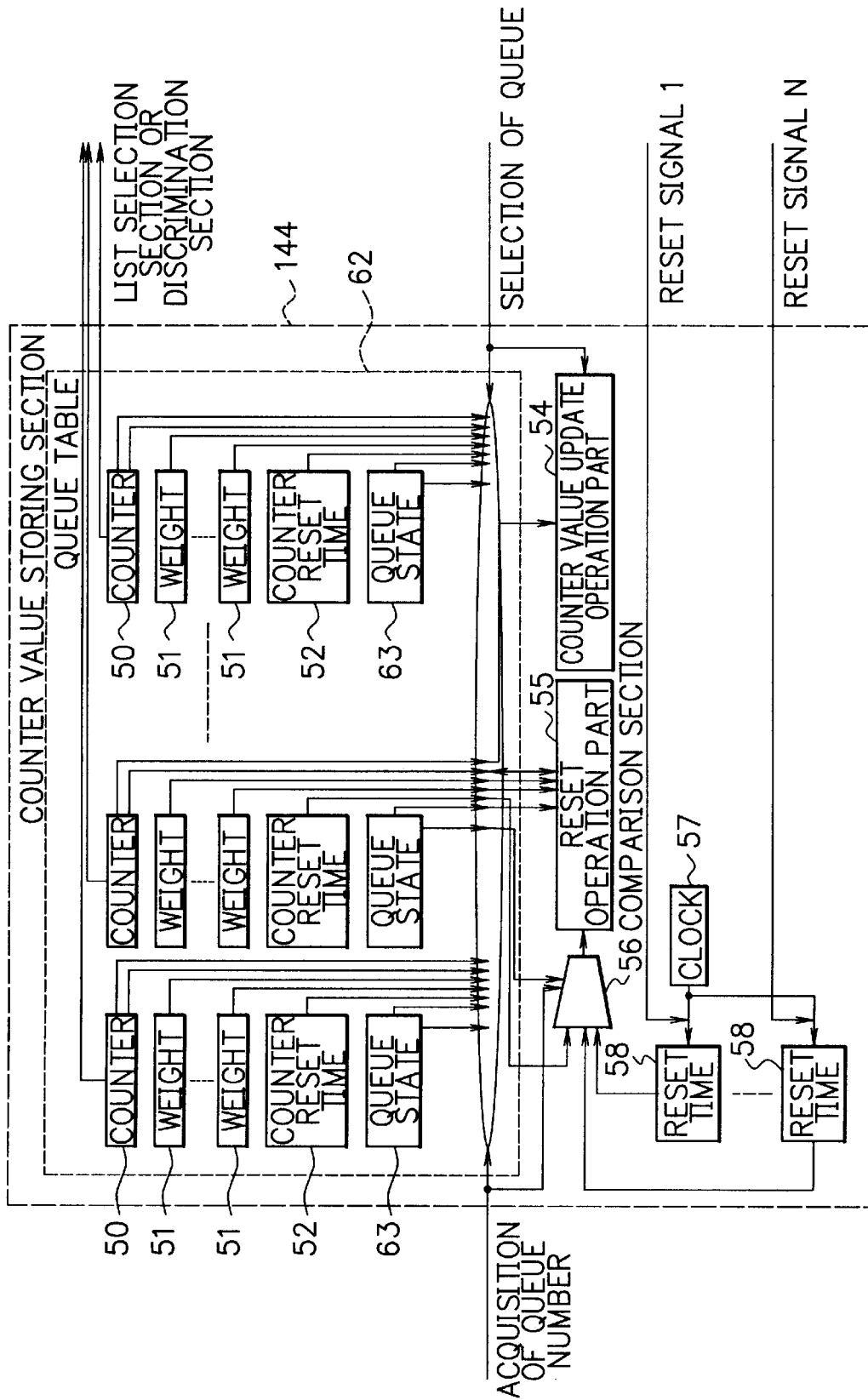
FIG. 30 is a block diagram showing a counter value storing section in the data output control device according to a sixteen the embodiment of the present invention.

FIG. 30 is a block diagram showing the counter value storing section in the present sixteenth embodiment. As shown in FIG. 30, a counter value storing section 144 comprises, in every respective queues, a counter 50, plural kinds of weights 51, a counter reset time 52 for holding a time when reset of the counter is implemented lastly, a queue table 62 having a queue state 63, a clock 57 for clocking current time, a reset time 58 for storing a time when the reset is instructed lastly in terms of the queue with the condition in every respective conditions, and a comparison section 56 for instructing a reset operation of the counter in relation to the reset operation part 55 in answer to the comparison result in between the counter reset time 52 and the corresponding reset time 58.

Next, operation of the present sixteenth embodiment will be described referring to FIG. 30. At the time when the reset operation is instructed, it causes the reset time 58 corresponding thereto to be updated to the current time. Subsequently, when the data is inputted to the data output control device, the comparison section 56 of the counter value storing section 144 compares the reset time 58 corresponding to the queue condition 63 of the queue within which the data is stored with the counter reset time 52 of the corresponding queue, if the reset time 58 is different from the counter reset time 52, the comparison section 56 causes the value of the counter 50 of the queue to be reset to the weight 51 corresponding to the condition of the queue. In case of outputting of the data from the respective queue, the counter value update operation part 54 causes the value of the counter 50 to be subtracted by one. Further, when the condition of the queue is changed, the comparison section 56 causes the counter reset time 52 of the queue to be set to the reset time 58 corresponding to the new condition of the corresponding queue.

The counter value storing section 144 of the present sixteenth embodiment, when the condition of the queue is dynamically changed, and when it is necessary to reset the counter to different value in every respective conditions, resolves the third problem of the Weighted Round Robin system. The state of the queue is taken to be two states of the priority state and the non-priority state, the reset signal 1 is taken to be the reset signal in terms of the queue of the priority state, the reset signal 2 is taken to be the reset signal in terms of the queue of the non-priority state. Thus it is capable of being adopted by way of the counter value storing section in the eighth to the thirteenth embodiments.

Furthermore, by way of the seventeenth embodiment, it might be thought the counter value storing section using reset number of times instead of the time in the sixteenth embodiment similar to the relationship in between the fourteenth embodiment and the fifteenth embodiment. The seventeenth embodiment is capable of being adopted by way of the counter value storing section in the eighth to the thirteenth embodiments similar to the sixteenth embodiment.

As described above, according to the present invention, it is capable of being obtained the following effects while guaranteeing the minimum data transmission speed in relation to the respective queues.

In the first aspect of the present invention, it is capable of diminishing processing amount of selecting operation of the queue and processing amount of qualification judgement for implementing the reset operation.

In the second aspect of the present invention, it is capable of allocating the surplus capacity to the queue with voluntary ratio.

In the third aspect of the present invention, the respective queues possess fixed order of priority based on the order of priority class to which the respective queues belong, so that it is capable of outputting data by priority from the queue which should transmits data by priority, while guaranteeing the minimum data speed in relation to the whole queues.

In the fourth aspect of the present invention, it is capable of reducing processing amount of the processing which is required simultaneously in order to implement the reset operation.

While preferred embodiments of the invention have been described using specific terms, such description is for illustrative purpose only, and it is to be understood that changes and variations may be made without departing from the spirit or scope of the following claims.

What is claimed is:

1. A data output control method in which there is provided a plurality of queues, thus causing an input data to be stored within an appropriate queue based on its attribute, subsequently outputting data to a single output circuit from these queues, comprising the steps of:

while using a plurality of lists within which queue numbers are stored, causing a single queue number to exist at most once in the whole plurality of lists;

storing said queue number within an appropriate list in answer to at least one condition, either data output propriety condition of said queue or degree of priority, unless said queue possesses data with exception of input data when input data is stored within said queue;

transmitting one of the data from a queue of a taken number while taking a queue number from a forefront of a list by selecting an appropriate list when outputting data to an output circuit, and while storing a queue number withing an appropriate list due to above condition if said queue possesses data with exception of the outputted data; and implementing reset operation of both of a change of the above condition of respective queues and a movement of queue number among the lists in every constant time interval or in every time when a specific list among said plurality of lists becomes empty.

2. A data output control method in which there is provided a plurality of queues, this causing an input data to be stored within an appropriate queue based on its attribute, subsequently outputting data to single output circuit from these queues, comprising the steps of:

while using both a transmittable queue number list for holding a number of a queue which has data and which is capable of outputting said data and a non-transmittable queue number list for holding a number of a queue which has data but which is incapable of outputting said data, causing identical queue numbers to exist at most once in the whole plurality of lists;

storing said queue number within an appropriate list in accordance with propriety of data transmission from a queue when said queue does not possess data with exception of input data while storing said input data within said queue;

transmitting one of the data from a queue of a taken number while taking a queue number from a forefront of said transmittable queue number list when outputting data to an output circuit, after the data transmission, if the queue possesses data with exception of the outputted data, causing said queue number to be stored again within an appropriate list, when the number of the data outputted from said queue after last reset operation becomes more than fixed number, said queue is taken to be non-transmittable state, while when said transmittable queue number list is empty in case of outputting data, whole queues are taken to be data transmission possible state, thus implementing a reset operation that it causes content of said non-transmittable queue number list to shift to said transmittable queue number list.

3. A data output control method in which there is provided a plurality of queues, thus causing an input data to be stored within an appropriate queue based on its attribute, subsequently outputting data to single output circuit from these queues, comprising the steps of:

while using both a transmittable priority queue number list for holding a number of a queue which has data and which is capable of outputting said data with priority, and a transmittable non-priority queue number list for holding a number of a queue which has data and which is capable of outputting said data without priority, causing identical queue numbers to exist at most once in the whole plurality of lists;

storing said queue number within an appropriate list in accordance with current degree of the priority from a queue when said queue does not possess data with exception of input data while storing said input data within said queue;

transmitting one of the data from a queue of a taken number while taking a queue number from the forefront of queue of said transmittable priority queue number list, if said transmittable priority queue number list is empty, thus taking a queue number from the forefront of said transmittable non-priority queue number list when outputting data to an output circuit, after the data transmission, if the queue possesses data with exception of the outputted data, causing said queue number to be stored again within an appropriate list in accordance with the degree of priority of said queue, when the number of data outputted from said queue after last reset operation becomes more tan fixed number, said queue is taken to be non-priority state; and taking the whole plurality of queues to be priority state in every fixed time intervals, this implementing a reset operation that it causes content of said transmittable non-priority queue number list to shift to said transmittable priority queue number list.

4. A data output control method in which there is provided a plurality of queues, thus causing an input data to be stored within an appropriate queue based on its attribute, subsequently outputting data to single output circuit from these queues, comprising the steps of:

while using a transmittable priority queue number list for holding a number of a queue which has data and which is capable of outputting said data with priority, a transmittable non-priority queue number list for holding a number of a queue which has data and which is capable of outputting said data without priority, and a non-transmittable queue number list for holding a number of a queue which has data but which is incapable of outputting said data, causing identical queue numbers to exist at most once in the whole plurality of lists;

storing said queue number within an appropriate list in accordance with current degree of the priority of said queue and propriety of data transmission from said queue, when said queue does not possess data with exception of said input data, while storing said input data within said queue;

transmitting one of the data from a queue of a taken number while taking a queue number from the forefront of queue of said transmittable priority queue number list, if said transmittable priority queue number list is empty, thus taking a queue number from the forefront of said transmittable non-priority queue number list before said queue is taken to be non-transmittable state, when outputting data to an output circuit, after the data transmission, if the queue possesses data with exception of the outputted data, causing said queue number to be stored again within an appropriate list, when the number of data outputted from said queue after last reset operation becomes more than fixed number, said queue is taken to be non-priority state, if said queue is of the non-priority state and said queue is not subjected to a reset operation in relation to the non-priority state at most one time, or if the number of the data transmitted from the queue after last reset operation in relation to the non-priority queue is more than another fixed number, thus taking said queue to be data an non-transmittable state; and implementing a reset operation in relation to the whole queues in every fixed time intervals, namely taking the whole queues to be data transmission possible state and priority state, thus implementing operation that it causes content of said transmittable non-priority queue number list and content of said non-transmittable queue number list to shift to said transmittable priority queue number list, further whenever said transmittable non-priority queue number list becomes empty, a reset operation in relation to non-priority queue, namely, taking the whole queues which are of the non-transmittable state to be the queues which are of the transmittable state, thus implementing operation that it causes content of said non-transmittable queue number list to shift to said transmittable non-priority queue number list.

5. A data output control method as claimed in claim 1, further comprising the steps of:

possessing respective kinds of lists corresponding each number of class for order of priority;

possessing fixed order of priority based on priority order class to which respective queues belong; and storing a queue number within a list of said priority order class to which said queue belongs in the list of storing kind when it causes the queue number to be stored within the list, while when taking the queue number from the list, taking the queue number from the list which has the queue number more than one, and which is of the highest priority order.

6. A data output control method as claimed in claim 2, further comprising the steps of:

possessing respective kinds of lists corresponding each number of class for order of priority;

possessing fixed order of priority based on priority order class to which respective queues belong; and storing a queue number within a list of said priority order class to which said queue belongs in the list of storing kind when it causes the queue number to be stored within the list, while when taking the queue number from the list, taking the queue number from the list which has the queue number more than one, and which is of the highest priority order.

7. A data output control method as claimed in claim 3, further comprising the steps of:

possessing respective kinds of lists corresponding each number of class for order of priority;

possessing fixed order of priority based on priority order class to which respective queues belong; and storing a queue number within a list of said priority order class to which said queue belongs in the list of storing kind when it causes the queue number to be stored within the list, while when taking the queue number from the list, taking the queue number from the list which has the queue number more than one, and which is of the highest priority order.

8. A data output control method as claimed in claim 4, further comprising the steps of:

possessing respective kinds of lists corresponding each number of class for order of priority;

possessing fixed order of priority based on priority order class to which respective queues belong; and storing a queue number within a list of said priority order class to which said queue belongs in the list of storing kind when it causes the queue number to be stored within the list, while when taking the queue number from the list, taking the queue number from the list which has the queue number more than one, and which is of the highest priority order.

9. A data output control method in which there is provided a plurality of queues, thus causing an input data to be stored within an appropriate queue based on its attribute, subsequently outputting data to a single output circuit from these queues, comprising the step of:

implementing a reset operation with the whole plurality of queues as the priority state in every fixed time intervals, while possessing two states of one state where respective queues are capable of transmitting data by priority and other state where respective queues are capable of transmitting data by non-priority, subsequently, said queue comes into non-priority state after transmission of data of fixed number, thus transmitting data from the queue in priority state in preference to the queue of the non-priority state, when there is no queue of the priority state or when the whole queues of the priority state do not possess the data, it causes the data to be transmitted with voluntary ratio from the queue of the non-priority state by using surplus capacity of the output circuit.

10. A data output control method as claimed in claim 9, wherein respective queues possess two states of one state where it is capable of transmitting data by priority and the other state where it is capable of transmitting data by non-priority, in addition thereto, possessing fixed order of priority based on the attributive priority order class.

11. A data output control method as claimed in claim 5, wherein it causes the reset operation in relation to respective queues to be implemented at respective queues individually instead of enforcement all together at the time when the reset operation is instructed, and a reset operation in relation to one queue is implemented, when data is inputted to said queue in the beginning after the reset operation is instructed.

12. A data output control method as claimed in claim 6, wherein it causes the reset operation in relation to respective queues to be implemented at respective queues individually instead of enforcement all together at the time when the reset operation is instructed, and a reset operation in relation to one queue is implemented, when data is inputted to said queue in the beginning after the reset operation is instructed.

13. A data output control method as claimed in claim 7, wherein it causes the reset operation in relation to respective queues to be implemented at respective queues individually instead of enforcement all together at the time when the reset operation is instructed, and a reset operation in relation to one queue is implemented, when data is inputted to said queue in the beginning after the reset operation is instructed.

14. A data output control method as claimed in claim 8, wherein it causes the reset operation in relation to respective queues to be implemented at respective queues individually instead of enforcement all together at the time when the reset operation is instructed, and a reset operation in relation to one queue is implemented, when data is inputted to said queue in the beginning after the reset operation is instructed.

15. A data output control method as claimed in claim 9, wherein it causes the reset operation in relation to respective queues to be implemented at respective queues individually instead of enforcement all together at the time when the reset operation is instructed, and a reset operation in relation to one queue is implemented, when data is inputted to said queue in the beginning after the reset operation is instructed.

16. A data output control method as claimed in claim 10, wherein it causes the reset operation in relation to respective queues to be implemented at respective queues individually instead of enforcement all together at the time when the reset operation is instructed, and a reset operation in relation to one queue is implemented, when data is inputted to said queue in the beginning after the reset operation is instructed.

17. A data output control method as claimed in claim 11, wherein it causes the time when a reset operation is instructed lastly to be stored, and the time when the last reset operation is implemented by respective queues to be stored, when storing the data within the respective queues, by comparing the time when the last reset operation of the queue which stores data with the time when the reset operation is instructed lastly, when the two times are different from with each other, it causes the reset operation to be implemented in terms of said queue.

18. A data output control method as claimed in claim 11, wherein it causes the number of times which a reset operation is instructed to be stored, and the number of times which the last operation is implemented by respective queues actually to be stored, when storing the data within respective queues, by comparing the number of times of the reset operation implemented by the queue which stores data with the number of times which the reset operation is instructed, if the two number of times are different from each other, it causes the reset operation to be implemented in terms of said queue.

* * * * *